(12) United States Patent
Dorminey et al.

(10) Patent No.: US 10,399,478 B2
(45) Date of Patent: Sep. 3, 2019

(54) TRUCK CONTAINER LIFT SYSTEMS AND METHODS OF MAKING AND USING THE SAME

(71) Applicants: Roger Donald Dorminey, Tifton, GA (US); Randall George Martin, Tifton, GA (US); James William Scott, Tifton, GA (US)

(72) Inventors: Roger Donald Dorminey, Tifton, GA (US); Randall George Martin, Tifton, GA (US); James William Scott, Tifton, GA (US)

( * ) Notice: Subject to any disclaimer, the term of this patent is extended or adjusted under 35 U.S.C. 154(b) by 205 days.

(21) Appl. No.: 15/632,466

(22) Filed: Jun. 26, 2017

(65) Prior Publication Data

US 2017/0369284 A1     Dec. 28, 2017

Related U.S. Application Data

(60) Provisional application No. 62/456,231, filed on Feb. 8, 2017, provisional application No. 62/493,267, filed on Jun. 27, 2016.

(51) Int. Cl.
| | |
|---|---|
| *B60P 1/64* | (2006.01) |
| *B66B 7/04* | (2006.01) |
| *B60P 7/10* | (2006.01) |
| *B60R 11/06* | (2006.01) |

(52) U.S. Cl.
CPC ............... *B60P 1/6445* (2013.01); *B60P 7/10* (2013.01); *B60R 11/06* (2013.01); *B66B 7/046* (2013.01)

(58) Field of Classification Search
CPC ........... B66B 9/02; B66B 9/022; B66B 9/025; B66B 7/024; B66B 7/025; B66B 7/04; B66B 7/046; B66B 7/02; B60P 7/10; B60P 1/6445; B60P 1/4485; B60P 1/52; B60R 11/06; B60R 9/00; B60R 9/065; B60R 2011/004; B60R 2011/0084; B60R 2011/0092; B66F 3/16; B66F 3/18
See application file for complete search history.

(56) References Cited

U.S. PATENT DOCUMENTS

| | | | |
|---|---|---|---|
| 4,635,992 A | 1/1987 | Hamilton | |
| D305,315 S | 1/1990 | Fletcher | |
| 5,016,858 A | 5/1991 | Mitchell | |
| 5,121,959 A | 6/1992 | King | |
| 5,303,969 A * | 4/1994 | Simnacher | B60R 11/06 224/494 |
| 6,010,046 A * | 1/2000 | Neeser | B60R 9/00 108/144.11 |
| 6,089,429 A * | 7/2000 | Everson | B60R 9/00 224/281 |
| 6,262,479 B1 | 7/2001 | Chou | |
| 6,264,083 B1 | 7/2001 | Pavlick | |
| 6,464,277 B2 | 10/2002 | Wilding | |

(Continued)

OTHER PUBLICATIONS

Woodcrafters Everything for the Woodworkers and More., Woodcrafts Lubber Sales, Inc. p. 13, Item H-3428, 2012 and 2013.

*Primary Examiner* — Glenn F Myers
(74) *Attorney, Agent, or Firm* — Withers & Keys, LLC

(57) ABSTRACT

Truck container lift systems are disclosed. Truck containers having at least one secure compartment are also disclosed. Methods of making and using truck container lift systems and truck containers having at least one secure compartment are further disclosed.

20 Claims, 32 Drawing Sheets

(56) References Cited

U.S. PATENT DOCUMENTS

| | | | |
|---|---|---|---|
| D488,428 S | 4/2004 | Greene | |
| 7,052,066 B2 | 5/2006 | Emery | |
| 7,182,177 B1 | 2/2007 | Simnacher | |
| D555,529 S | 10/2007 | Klinkman | |
| D626,062 S | 10/2010 | Giddens | |
| 8,162,190 B2 | 4/2012 | Hanson | |
| D658,373 S | 5/2012 | Gros | |
| 8,393,665 B2 | 3/2013 | Vilano | |
| 8,696,182 B2 | 1/2014 | Gordon | |
| D713,323 S | 9/2014 | Gearner, III | |
| D722,009 S | 2/2015 | Roach | |
| D755,707 S | 5/2016 | Roach | |
| D757,630 S | 5/2016 | Boyce | |
| 9,352,698 B2 | 5/2016 | Romanelli | |
| D765,014 S | 8/2016 | Roach | |
| D768,810 S | 9/2016 | Haun | |
| D770,962 S | 11/2016 | Badillo | |
| D771,544 S | 11/2016 | Christofferson | |
| D772,141 S | 11/2016 | Christofferson | |
| 9,481,403 B1 * | 11/2016 | Johnson | B62D 33/023 |
| 9,862,333 B1 | 1/2018 | Jones | |
| D816,587 S | 5/2018 | Perkins | |
| D818,420 S | 5/2018 | Roach | |
| 2010/0051662 A1 | 3/2010 | Hanson | |
| 2011/0284602 A1 | 11/2011 | Lamouroux | |
| 2012/0200106 A1 * | 8/2012 | Villano | B60R 9/065 296/37.6 |
| 2014/0231477 A1 * | 8/2014 | Perkins | B60R 11/06 224/404 |
| 2015/0086312 A1 | 3/2015 | Ohnesorge | |
| 2016/0368542 A1 | 12/2016 | Taylor | |
| 2018/0043814 A1 | 2/2018 | Presby | |

\* cited by examiner

TRUCK CONTAINER LIFT SYSTEMS AND METHODS OF MAKING AND USING THE SAME

CROSS-REFERENCE TO RELATED APPLICATIONS

This patent application claims the benefit of priority to (i) U.S. Provisional Patent Application Ser. No. 62/493,267 filed on Jun. 27, 2016 and entitled "A TOOL BOX REPOSITIONING DEVICE", and (ii) U.S. Provisional Patent Application Ser. No. 62/456,231 filed on Feb. 8, 2017 and entitled "TRUCK CONTAINER LIFT SYSTEMS AND METHODS OF MAKING AND USING THE SAME", the subject matter of both of which is hereby incorporated by reference in its entirety.

FIELD OF THE INVENTION

This invention generally relates to truck containers (i.e., toolboxes) and lift systems for truck containers. This invention also relates to methods of making truck containers and lift systems, as well as methods of using truck containers and lift systems.

BACKGROUND

Efforts continue to further develop truck accessories such as truck containers (i.e., toolboxes) and lift systems for truck containers.

SUMMARY OF THE INVENTION

The present invention is directed to truck containers (i.e., toolboxes) and lift systems for truck containers. In one exemplary embodiment, the truck container lift system comprises a pair of lifting components positionable along opposite side surfaces of a truck bed behind a driver cab of the truck, the pair of lifting components being capable of lifting a truck container positioned between the pair of lifting components without occupying any truck bed surface area between the pair of lifting components. Each pair of lifting components may comprise a number of components including, but not limited to, a mounting plate, a mounting plate adjustable extension, a carriage plate, a gear rack, a carriage plate gear, and the one or more attachment rollers as discussed below.

In another exemplary embodiment, the truck container lift system comprises (I) a pair of lifting components positionable along opposite side surfaces of a truck bed behind a driver cab of the truck, said pair of lifting components being capable of lifting a truck container positioned between said pair of lifting components without occupying any truck bed surface area between said pair of lifting components, wherein each lifting component within said pair of lifting components comprises (1) an attachment shelf on which opposite outer lower side edges of a truck container rest when the truck container is positioned between said pair of lifting components, and (2) a mounting plate that extends from a truck bed surface to a securing location along an upper side surface of said opposite side surfaces of the truck bed; and (II) a truck container positioned (i) between said pair of lifting components and (ii) behind the driver cab of the truck, wherein no component of said truck container lift system extends through said truck container.

In yet another exemplary embodiment, the truck container lift system comprises (I) a pair of lifting components positionable along opposite side surfaces of a truck bed behind a driver cab of the truck, said pair of lifting components being capable of lifting a truck container positioned between said pair of lifting components without occupying any truck bed surface area between said pair of lifting components; wherein each lifting component within said pair of lifting components comprises (1) an attachment shelf on which opposite outer lower side edges of a truck container rest when the truck container is positioned between said pair of lifting components, and (2) a mounting plate that extends from a truck bed surface to a securing location along an upper side surface of said opposite side surfaces of the truck bed; and (II) a truck container positioned (i) between said pair of lifting components and (ii) behind the driver cab of the truck, said truck container comprising: a container housing comprising: (a) a housing upper surface, (b) a housing lower surface comprising a main body lower surface and outer edge lower surfaces on opposite ends of said main body lower surface, said outer edge lower surfaces being sized and configured to rest along upper edges of a truck bed with said main body lower surface extending into the truck bed; and (c) one or more housing outer side surfaces extending between said housing upper surface and housing lower surface so as to form a housing outer surface that, in combination with said housing upper surface, surrounds and encompasses a housing volume; wherein at least one opposing housing outer side surface within said one or more housing outer side surfaces (i) extends between said main body lower surface and said outer edge lower surface, and (ii) comprises one or more openings therein, said one or more openings providing access to one or more secure storage compartments within housing volume, and wherein no component of said truck container lift system extends through said truck container.

The present invention is also directed to methods of making truck container (i.e., toolboxes) lift systems. In one exemplary embodiment, the method of making a truck container lift system comprises forming one or more components within each pair of lifting components; and assembling the one or more components with one another so as to form each pair of lifting components.

The present invention is further directed to methods of using truck container (i.e., toolboxes) lift systems. In one exemplary embodiment, the method of using a truck container lift system comprises a method of vertically moving a truck container positioned within a bed of a truck, wherein the method comprises using any of the herein described truck container lift systems to vertically move a truck container positioned (i) between the pair of lifting components and (ii) behind the driver cab of the truck. The method may comprise one or more steps including: (1) lowering the truck container to a secure position in which one or more secure storage compartments within a housing volume are inaccessible due to side walls of a truck bed; and (2) raising the truck container to an unsecure position in which the one or more secure storage compartments within the housing volume are accessible above the side walls of the truck bed.

The present invention is further directed to truck containers having at least one secure storage compartment within a housing volume the truck container. In one exemplary embodiment, the truck container comprises a container housing comprising: (a) a housing upper surface, (b) a housing lower surface comprising a main body lower surface and outer edge lower surfaces on opposite ends of the main body lower surface, the outer edge lower surfaces being sized and configured to rest along upper edges of a truck bed with the main body lower surface extending into the truck bed; and (c) one or more housing outer side surfaces extending between the housing upper surface and the housing lower surface so as to form a housing outer surface that, in combination with the housing upper surface, surrounds and encompasses a housing volume; wherein at least one opposing housing outer side surface within the one or more housing outer side surfaces (i) extends between the main body lower surface and the outer edge lower surface, and (ii) comprises one or more openings therein, the one or more openings providing access to one or more secure storage compartments within housing volume.

The present invention is even further directed to methods of making truck containers. In one exemplary embodiment, the method of making a truck container comprises forming the container housing so as to form the one or more secure storage compartments within housing volume. The method of making a truck container may further comprise forming a container lid for the container housing.

The present invention is even further directed to methods of using truck containers. In one exemplary embodiment, the method of using a truck container comprises placing one or more objects within the one or more secure storage compartments within housing volume. The one or more objects may comprise, for example, a pistol, a rifle, a safe, a removable lockbox, a suitcase, a travel bag, food, or any combination thereof.

These and other features and advantages of the present invention will become apparent after a review of the following detailed description of the disclosed embodiments and the appended claims.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION

The present invention is directed to truck container lift systems such as exemplary truck container lift system 1000 shown in FIGS. 1-18, and truck containers such as exemplary truck toolbox 10 shown in FIGS. 19-31, and combinations of truck container lift systems such as exemplary truck container lift system 1000 shown in FIGS. 1-18 and truck containers such as exemplary truck toolbox 10 shown in FIGS. 19-31. The present invention is further directed to methods of making and using exemplary truck container lift system 1000 shown in FIGS. 1-18 and truck containers such as exemplary truck toolbox 10 shown in FIGS. 19-31.

The present invention provides a novel and unique method of creating more useable space in the bed of a pickup truck, and like vehicles, having a storage container known as a tool box situated in the bed of the truck behind the driver cab.

The present invention elevates and repositions the container using a novel and unique mechanism. The positioning of the lifting mechanism is unique as well as the construction and design of same. The present invention elevates the container without the use of a mechanism under the tool box body occupying usable space.

Figure 1:
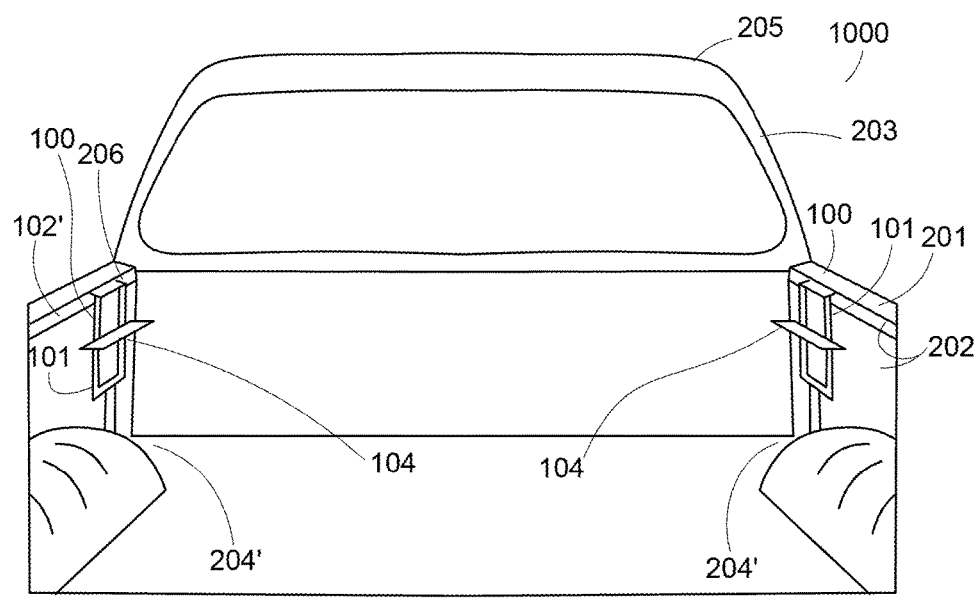
FIG. 1 is a perspective view of a truck bed of a pick-up truck with an exemplary container lift system of the present invention shown positioned therein.

In some embodiments, the elevating device and method is comprised of two identical lifting components 100 attached to the inside of the truck side panels immediately behind the driver cab (see, for example, exemplary container lift system 1000 shown in FIG. 1) on which the lateral ends of the tool box (not shown) are attached. In some embodiments, the lifting mechanism consists of a mounting plate (see, for example, exemplary mounting plate 101 shown in FIG. 2) that is attached to the truck with an adjustable extension (see, for example, exemplary mounting plate adjustable extension 102 shown in FIG. 2a) and a carriage plate (see, for example, exemplary carriage plate 103 shown in FIG. 3) that is incorporated into the mounting plate by attachment rollers that in turn provides an attachment shelf to which the toolbox is secured. The mounting plate 101 can also be attached to the rear of the cab and spaced at the extreme lateral ends of the tool box and attached to it.

In either case, when the carriage plate at each end of the tool box is lifted, for example, by the rack and pinion (see, FIG. 4) lifting mechanism incorporated on the mounting plate (see, FIG. 4), the tool box is raised to a position allowing the use of space formally occupied by the box (see, FIG. 1).

Figure 5:
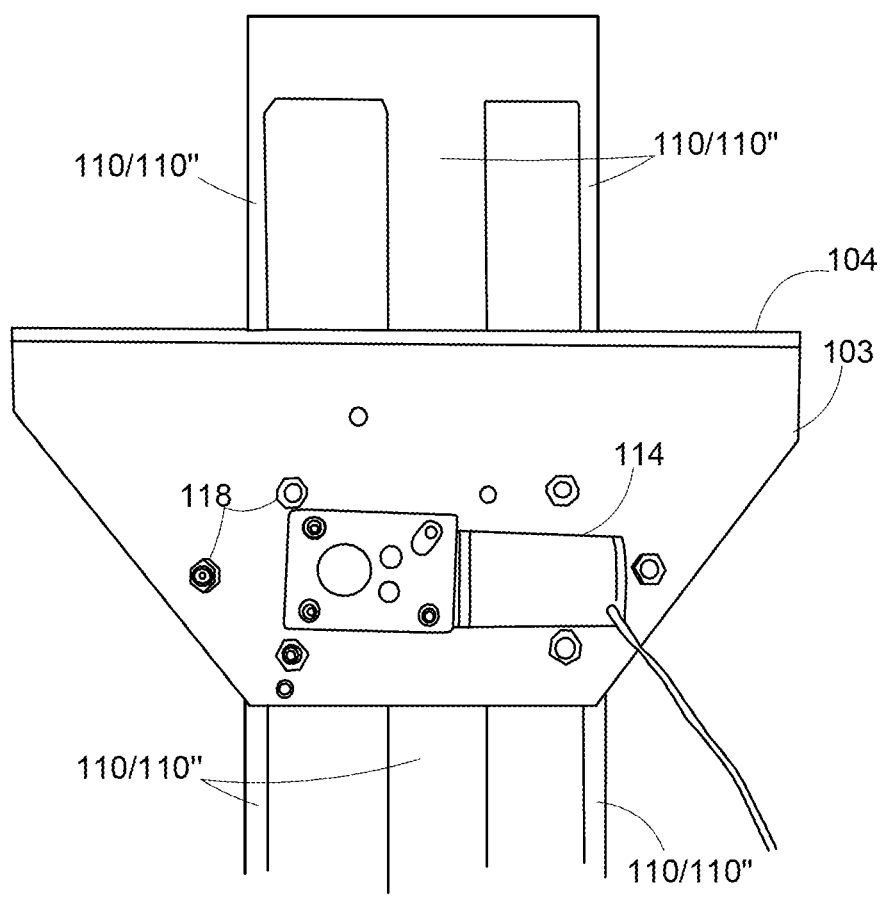
FIG. 5 is a frontal view of the exemplary container lift system shown in FIG. 4.
Figure 6:
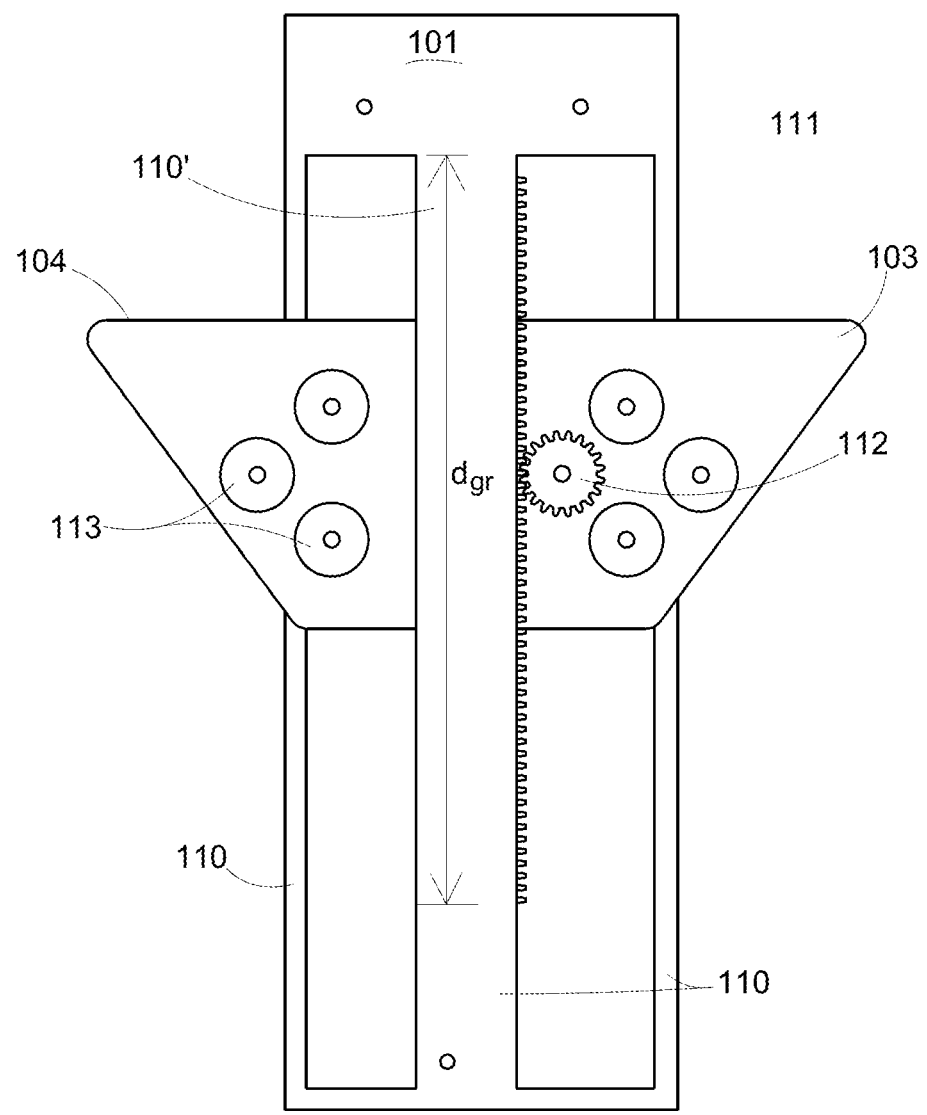
FIG. 6 is another rear view of the exemplary container lift system shown in FIG. 4.
Figure 7:
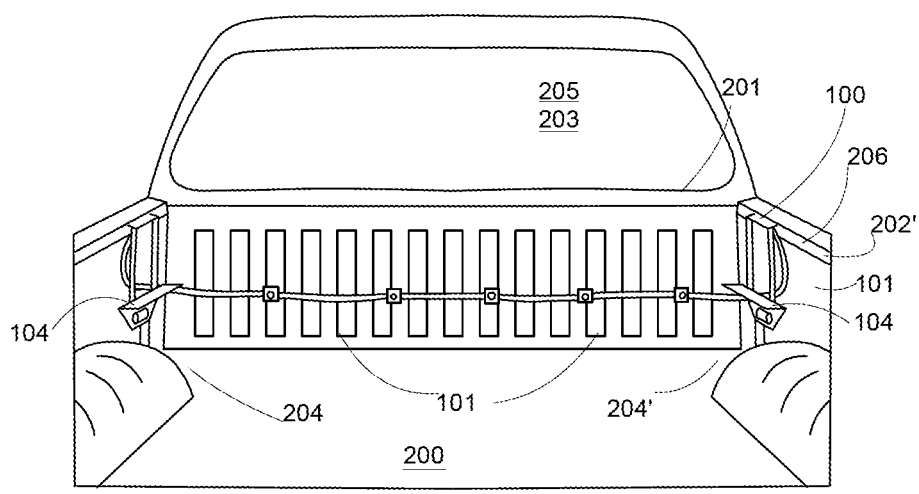
FIG. 7 is a perspective view of a truck bed of a pick-up truck with an exemplary container lift system of the present invention shown in a lower list system position.
Figure 8:
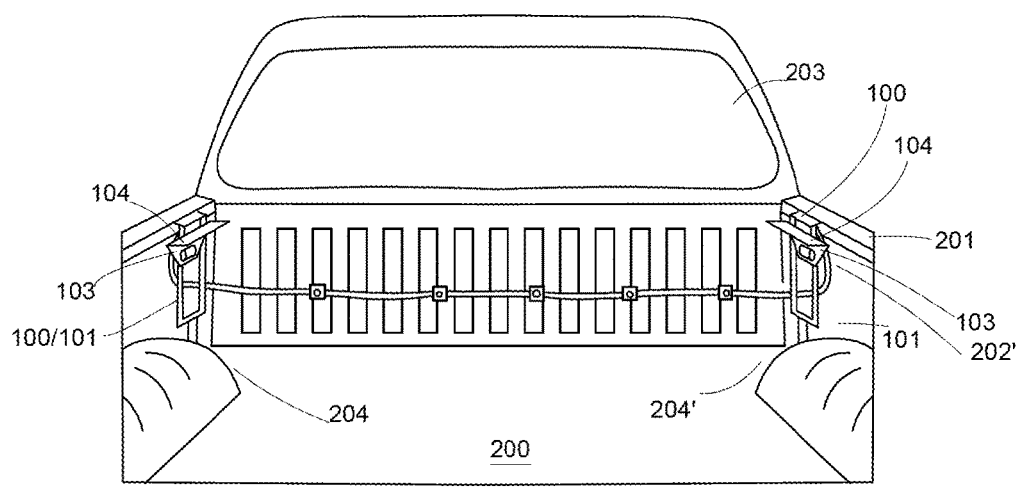
FIG. 8 is a perspective view of the truck bed of the pick-up truck shown in FIG. 7 with the exemplary container lift system in a lifted list system position.
Figure 9:
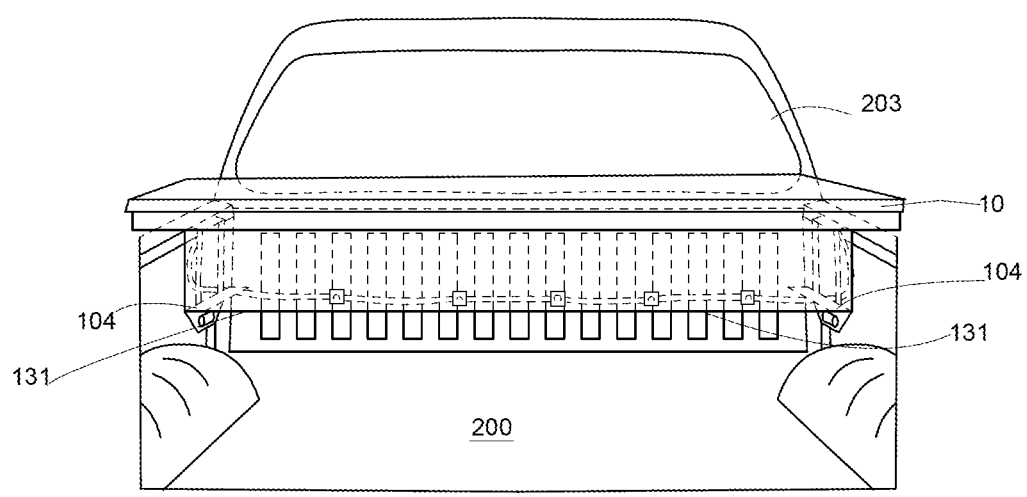
FIG. 9 is a perspective view of the truck bed of the pick-up truck shown in FIG. 7 with an exemplary truck container positioned on the exemplary container lift system of the present invention in a lower list system position.
Figure 10:
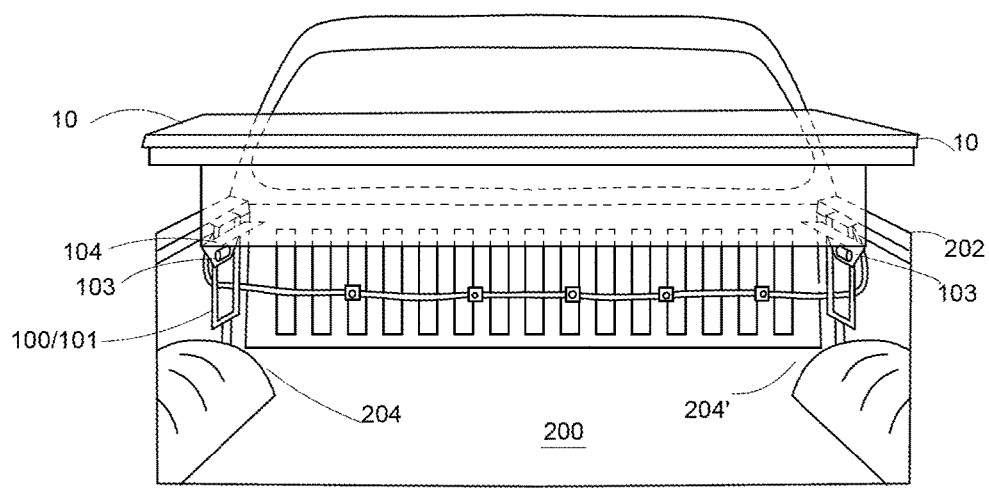
FIG. 10 is a perspective view of the truck bed of the pick-up truck and the exemplary truck container shown in FIG. 9 with the exemplary truck container positioned on the exemplary container lift system of the present invention in a lifted list system position.
Figure 11:
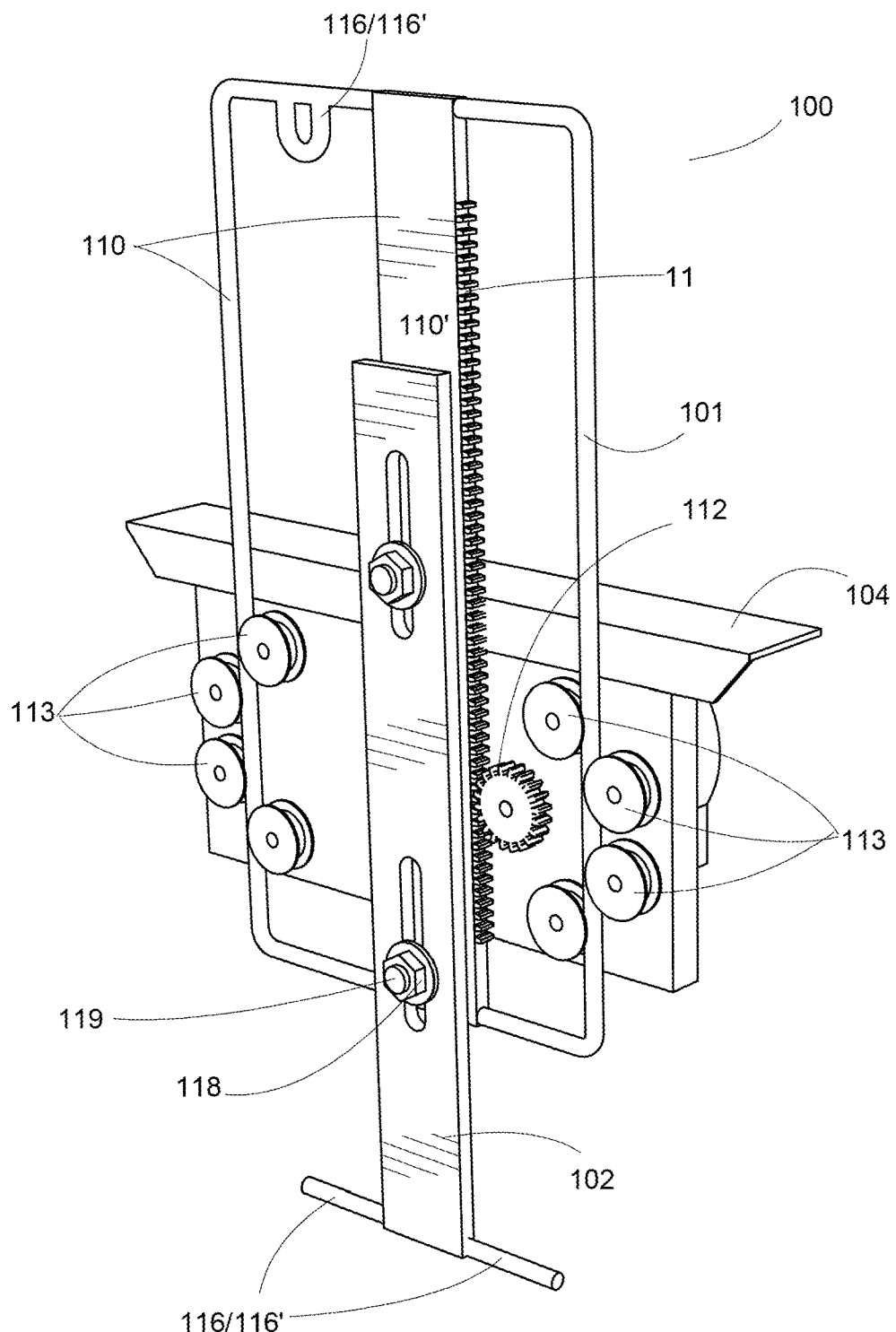
FIG. 11 is a perspective view of an exemplary truck container lift system of the present invention as viewed from a front side of the truck container lift system.
Figure 12:
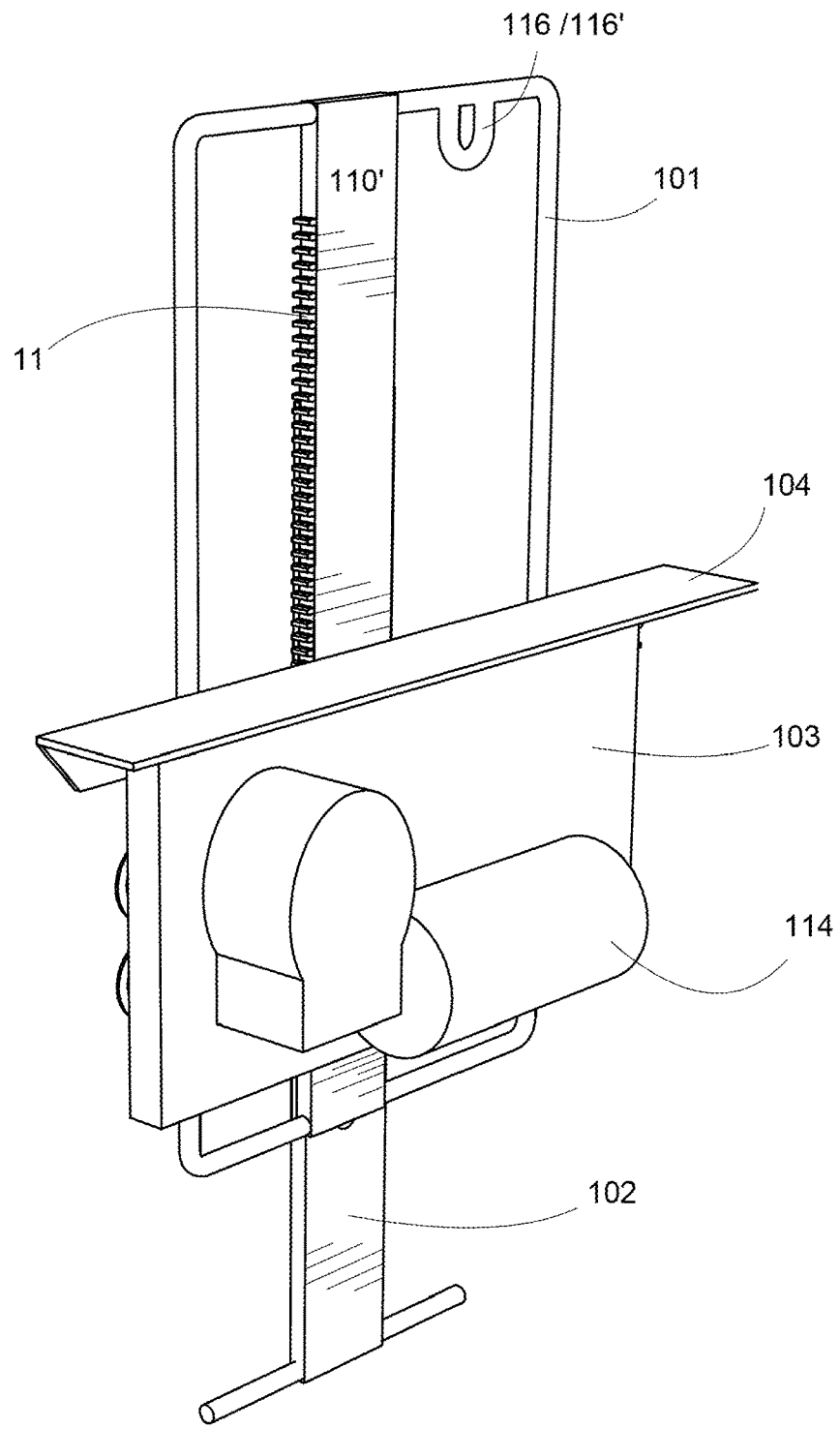
FIG. 12 is a perspective view of an exemplary truck container lift system of the present invention as viewed from a rear side of the truck container lift system.
Figure 13:
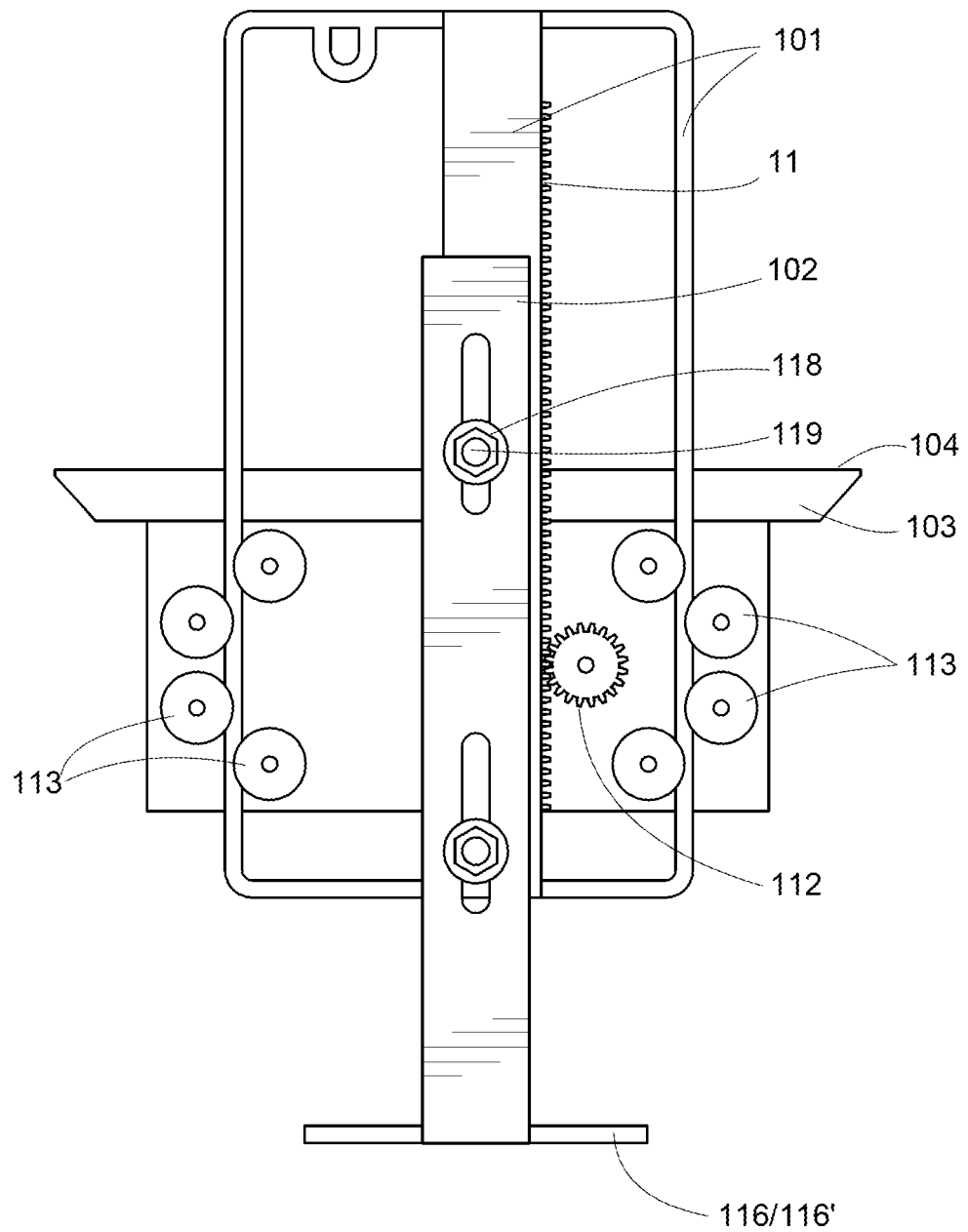
FIG. 13 is a frontal view of the exemplary truck container lift system shown in FIG. 11.
Figure 14:
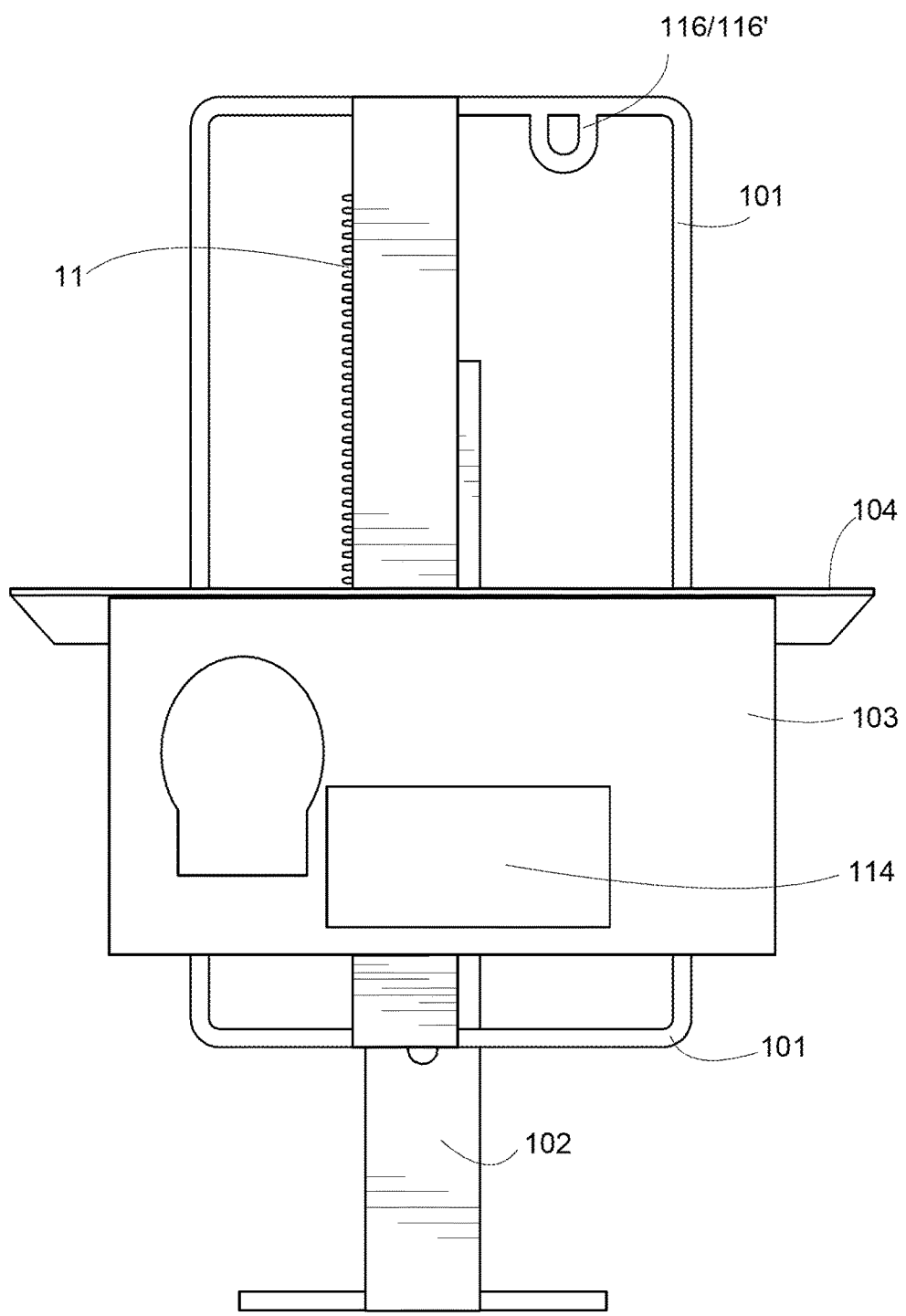
FIG. 14 is a rear view of the exemplary truck container lift system shown in FIG. 11.
Figure 15:
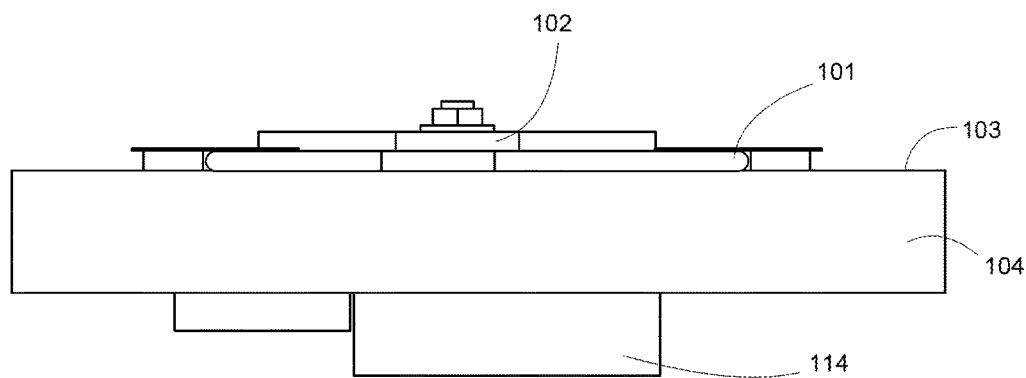
FIG. 15 is a top view of the exemplary truck container lift system shown in FIG. 11.
Figure 16:
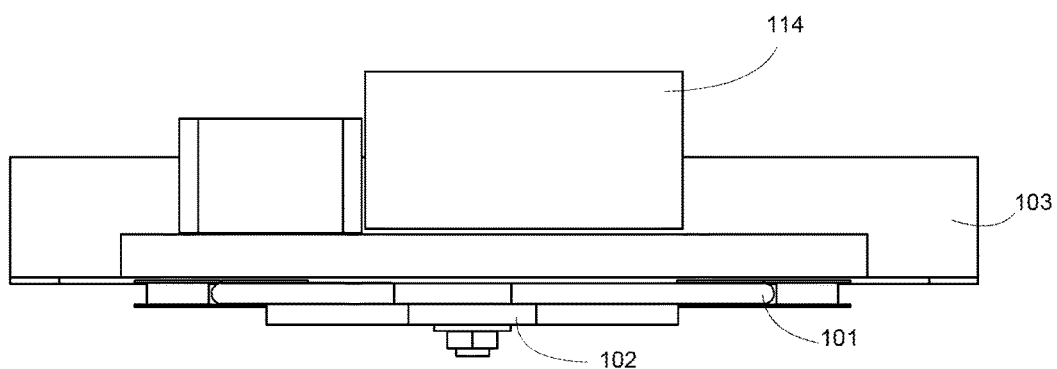
FIG. 16 is a bottom view of the exemplary truck container lift system shown in FIG. 11.
Figure 17:
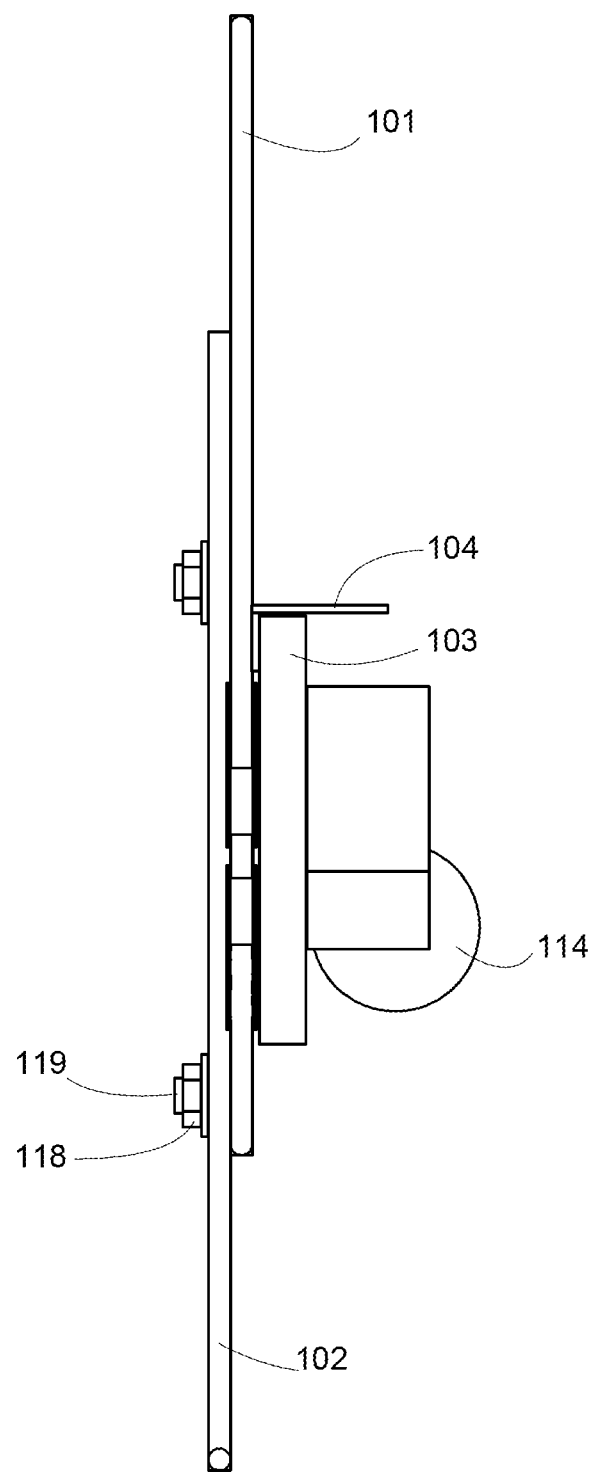
FIG. 17 is a side view as viewed from the right-hand side of the exemplary truck container lift system shown in FIG. 13.
Figure 18:
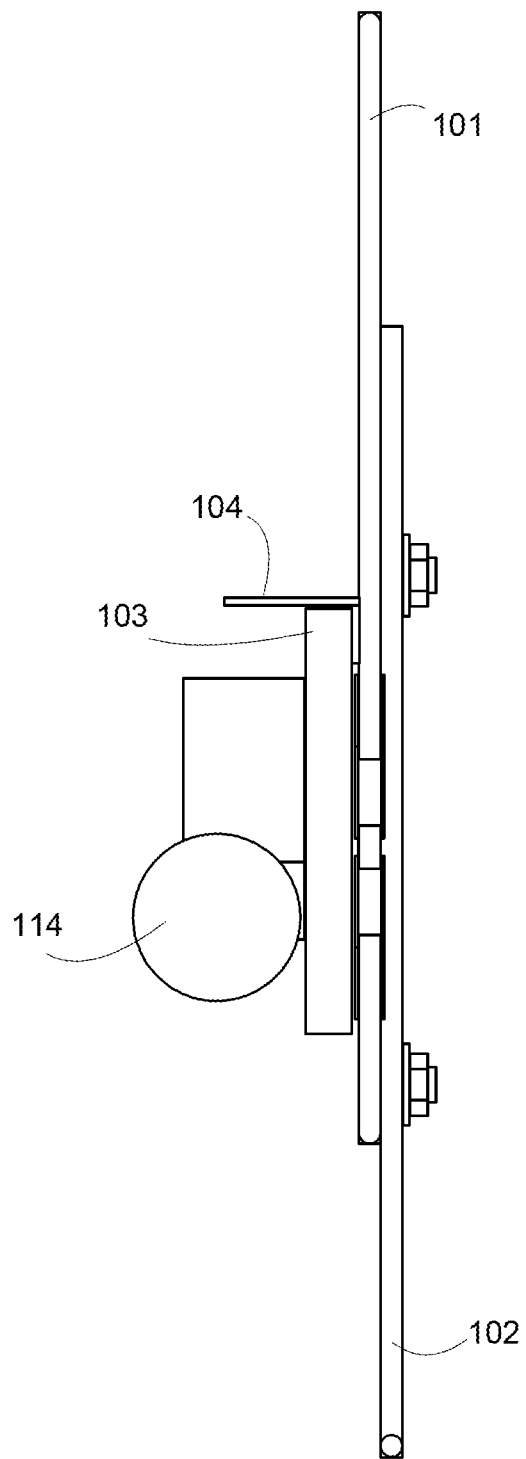
FIG. 18 is a side view as viewed from the left-hand side of the exemplary truck container lift system shown in FIG. 13.
Figure 19:
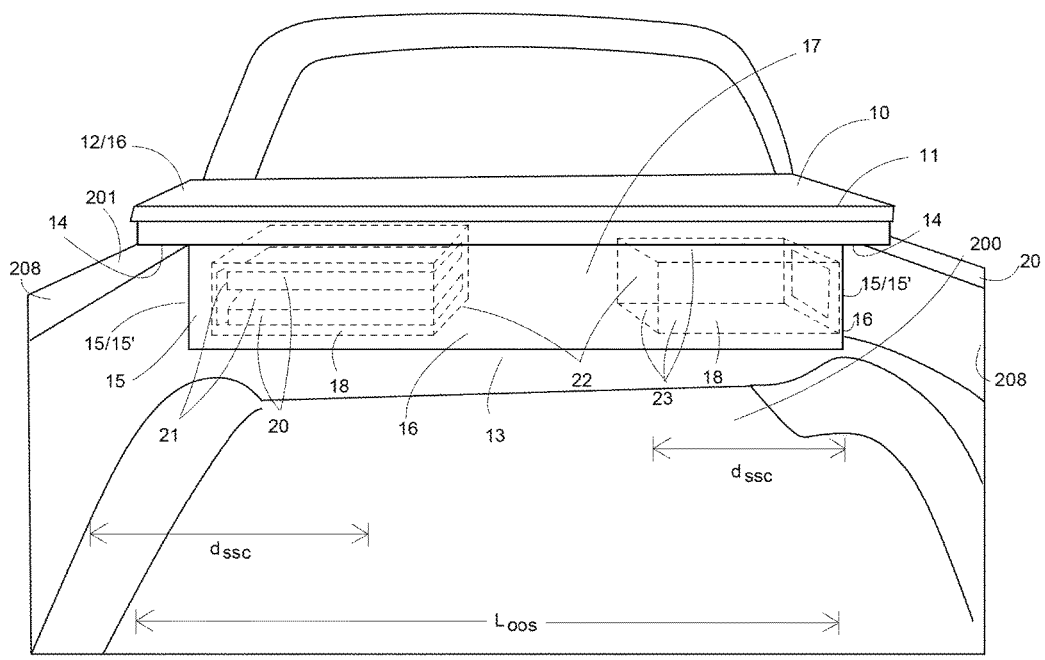
FIG. 19 is a perspective view of an exemplary truck container of the present invention with at least one secure side-entry compartment therein.
Figure 20:
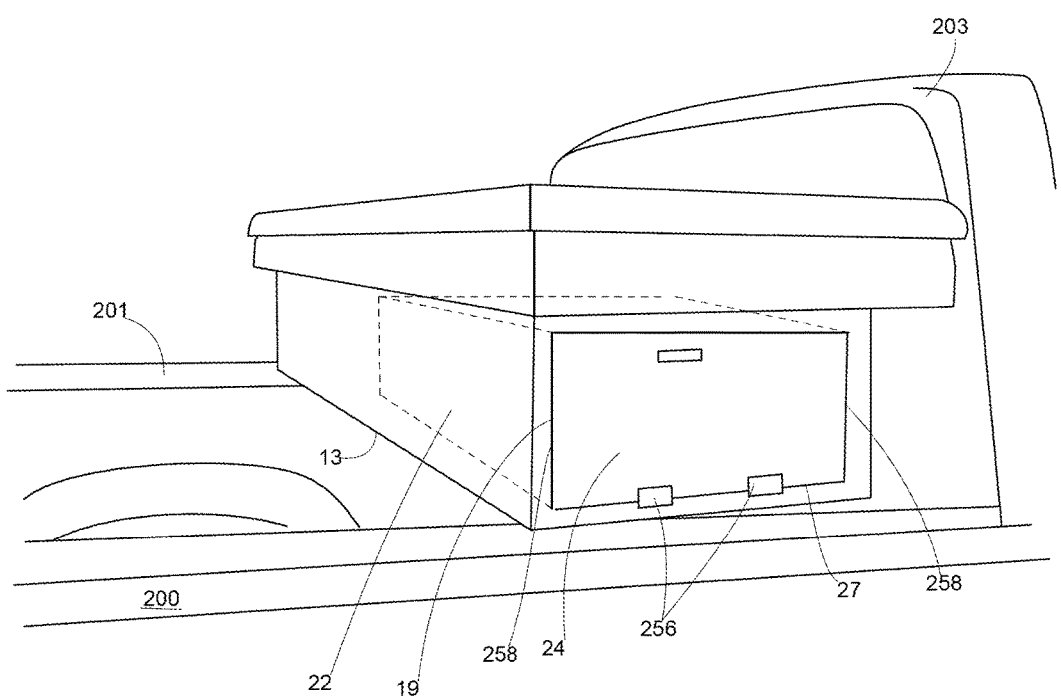
FIG. 20 is a side perspective view of the exemplary truck container shown in FIG. 19 in a lifted lift system position, providing access at a secure side-entry compartment therein.
Figure 21:
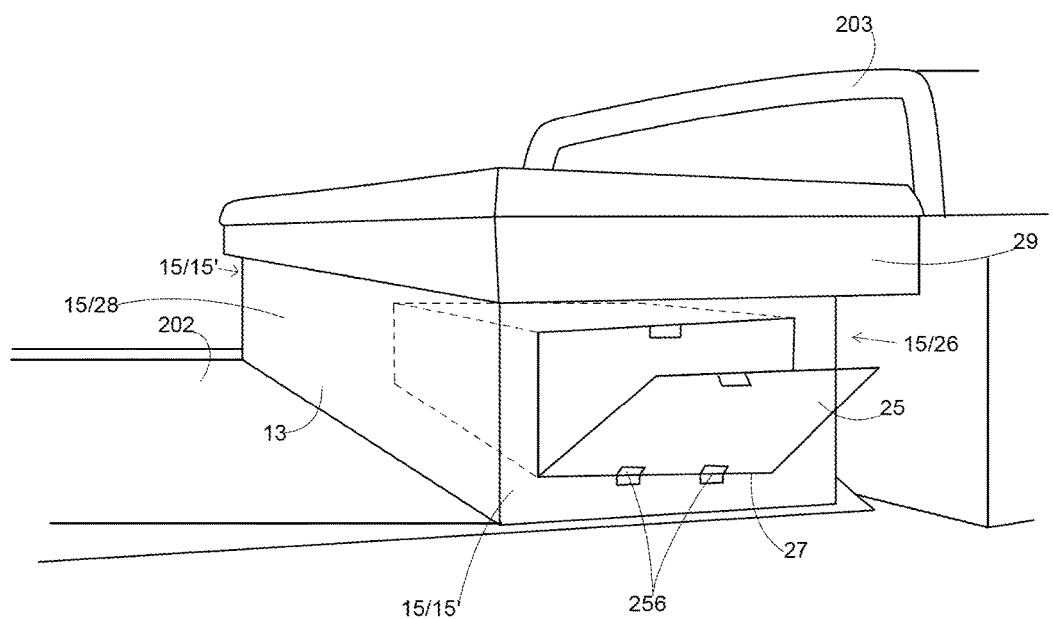
FIG. 21 is a side perspective view of the exemplary truck container shown in FIG. 20 with a door to the secure side-entry compartment in an opened condition.
Figure 22:
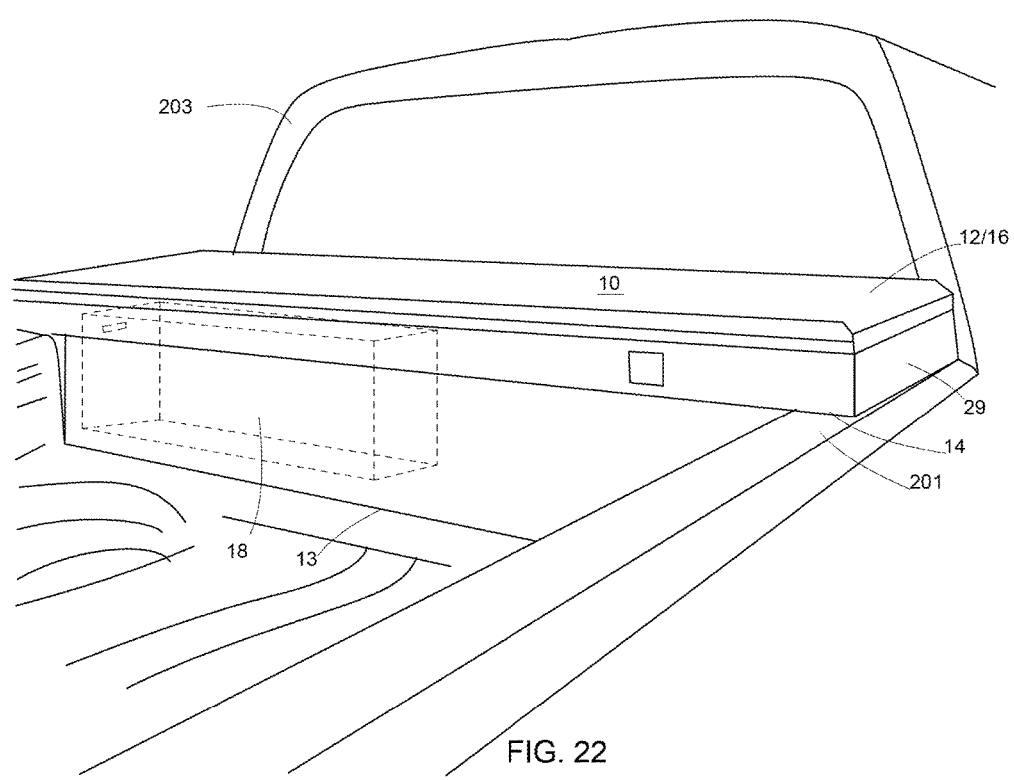
FIG. 22 is a side perspective view of an exemplary truck container with a door to the secure side-entry compartment in a closed secure condition.
Figure 23:
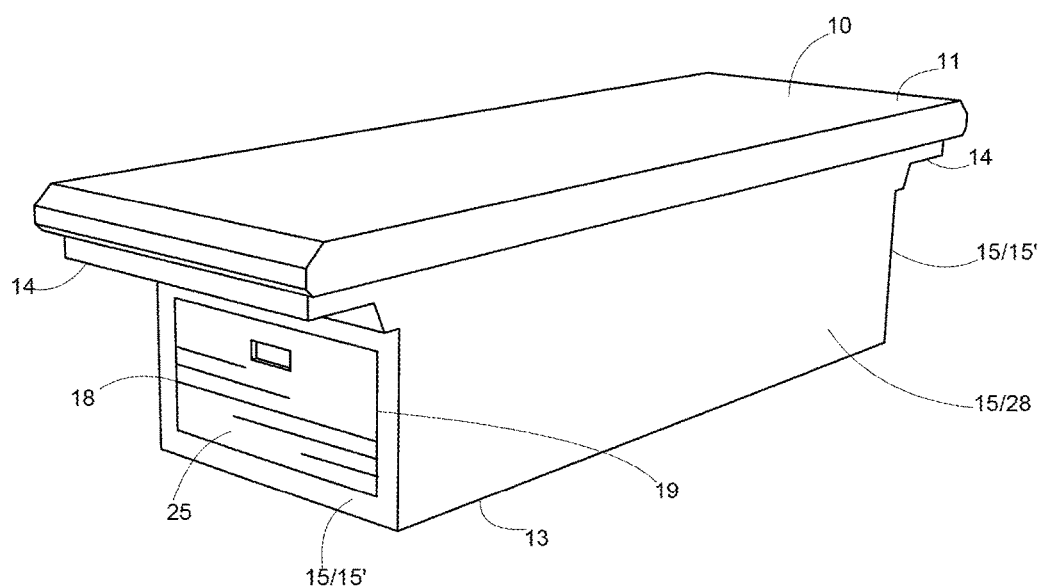
FIG. 23 is a perspective view of an exemplary truck container with secure side-entry compartment of the present invention as viewed from a front side of the truck container.
Figure 24:
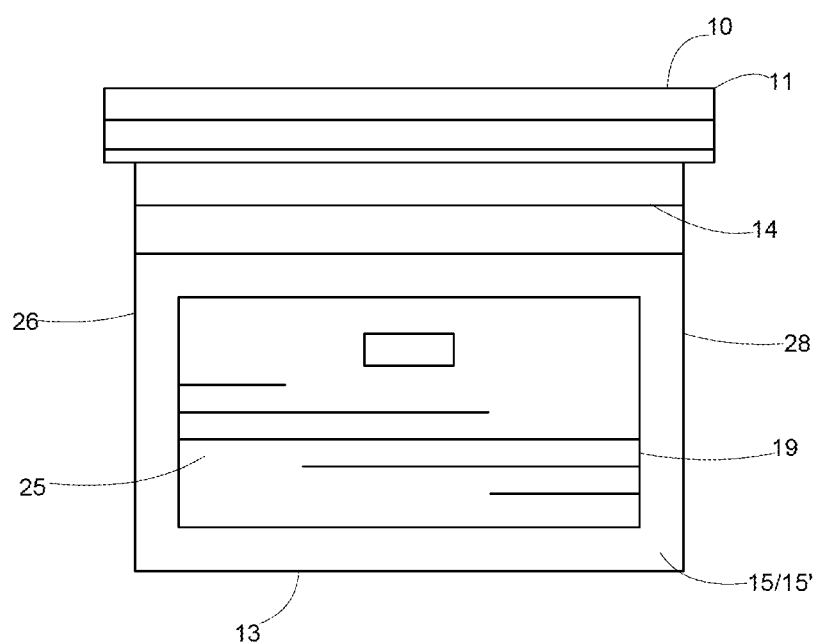
FIG. 24 is a side view as viewed from the left-hand side of the exemplary truck container with secure side-entry compartment shown in FIG. 23.
Figure 25:
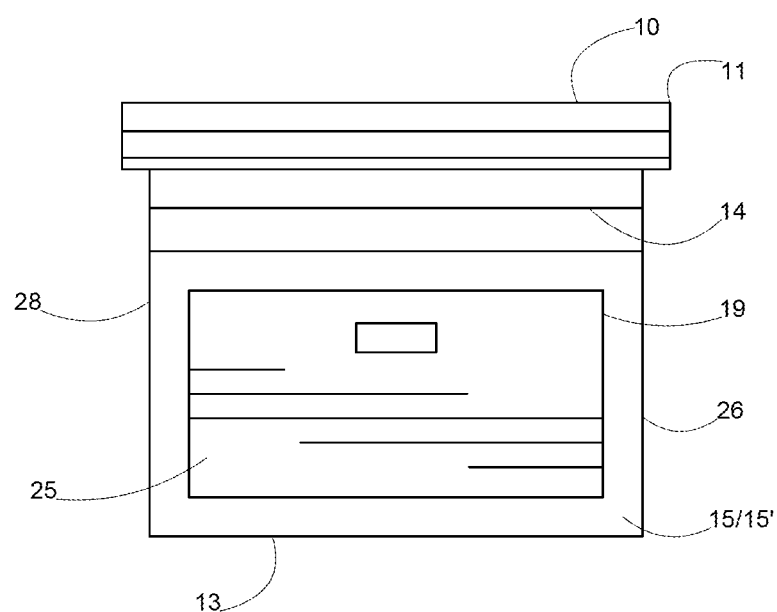
FIG. 25 is a side view as viewed from the right-hand side of the exemplary truck container with secure side-entry compartment shown in FIG. 23.
Figure 26:
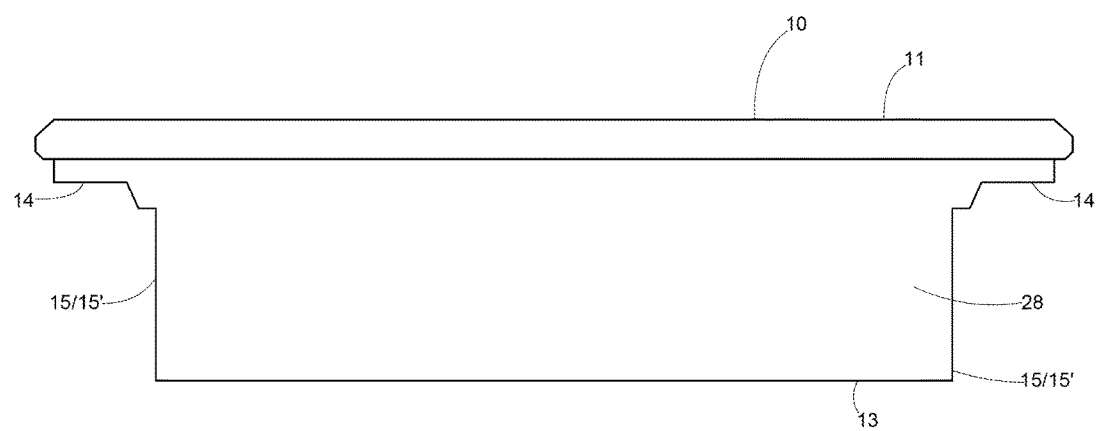
FIG. 26 is a frontal view of the exemplary truck container with secure side-entry compartment shown in FIG. 23.
Figure 27:
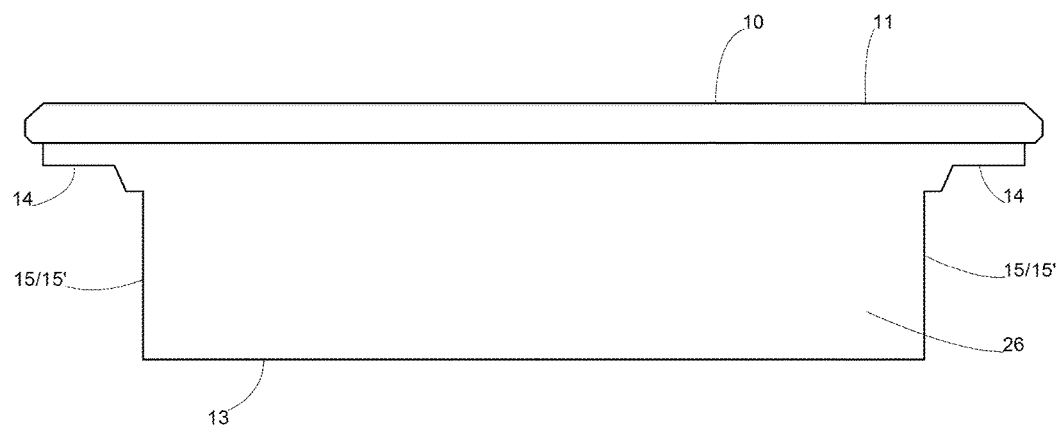
FIG. 27 is a rear view of the exemplary truck container with secure side-entry compartment shown in FIG. 23.
Figure 28:
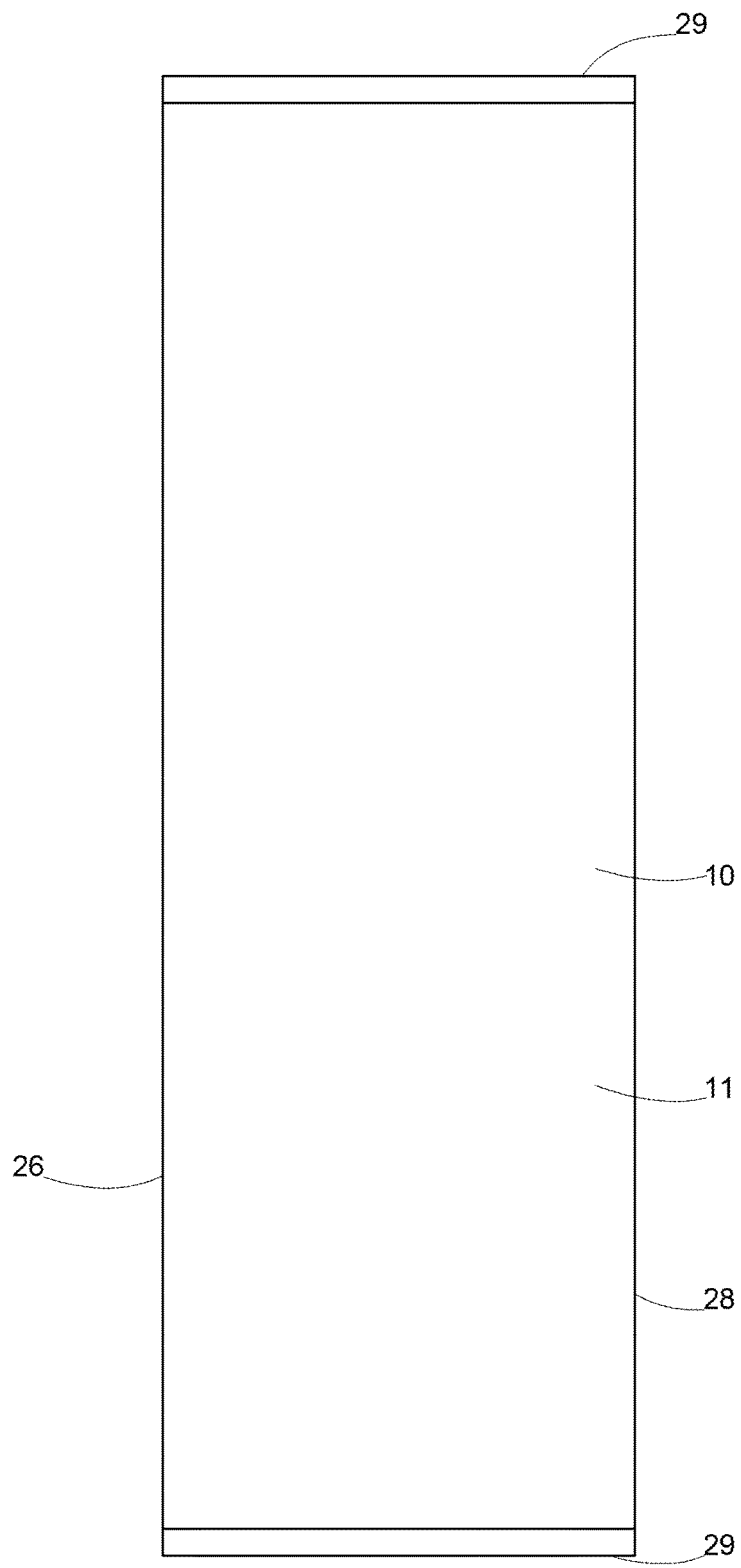
FIG. 28 is a top view of the exemplary truck container with secure side-entry compartment shown in FIG. 23.
Figure 29:
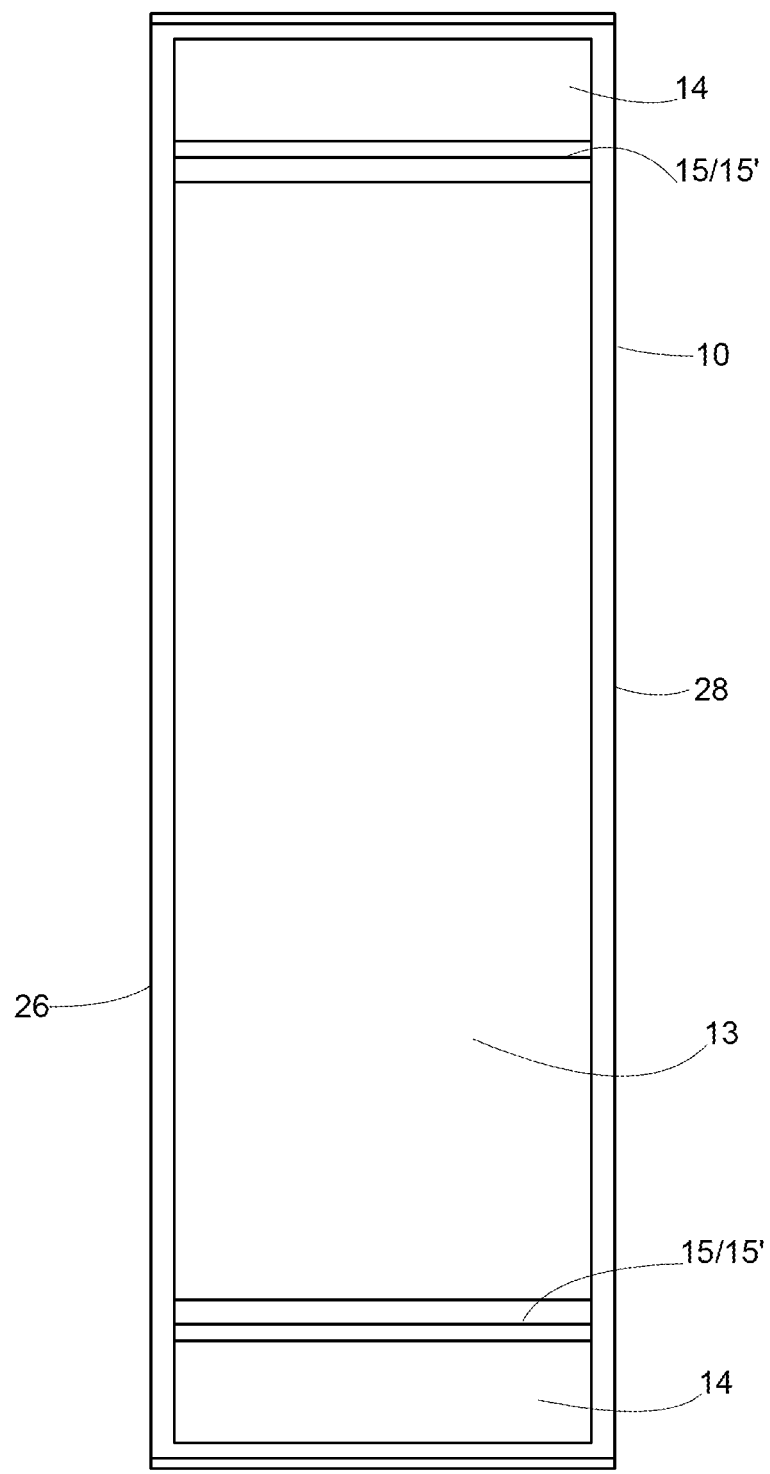
FIG. 29 is a bottom view of the exemplary truck container with secure side-entry compartment shown in FIG. 23.
Figure 30:
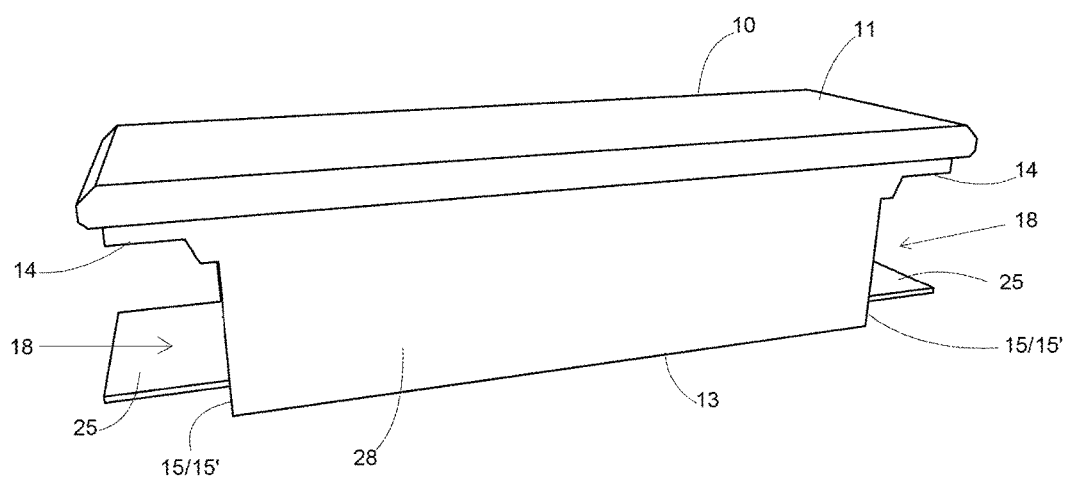
FIG. 30 is a perspective view of the exemplary truck container with secure side-entry compartment shown in FIG. 23 as viewed with each opposing door to the secure side-entry compartment of the truck container in an open position.
Figure 31:
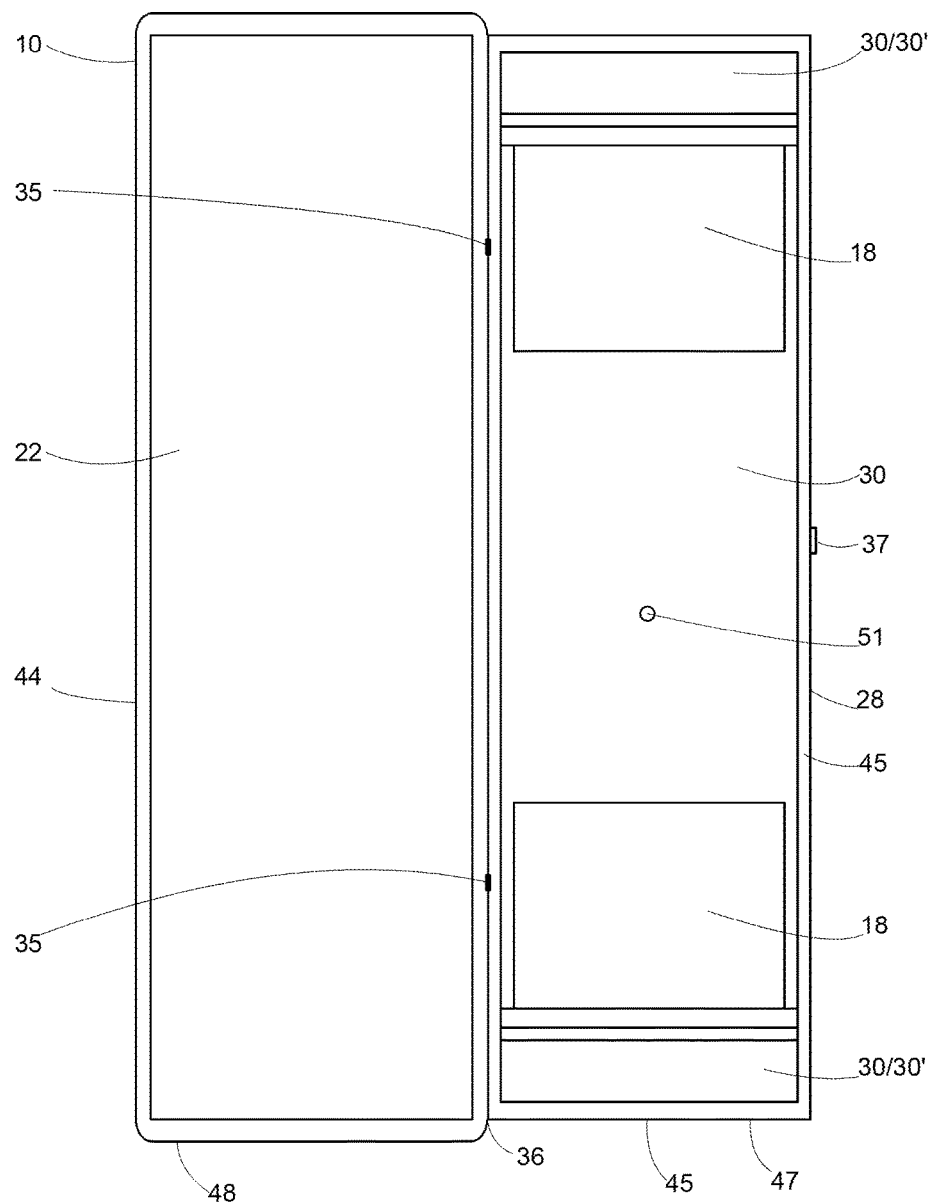
FIG. 31 is a top view of the exemplary truck container with secure side-entry compartment shown in FIG. 1 as viewed with an upper container lid in an open position and secure side-entry compartments of the truck container shown in dashed lines to indicate access via the side-entry only, not via the upper container lid.

In some embodiments, the methods and systems used to raise the carriage plate comprises a rack and pinion mechanism powered by a 12 volt electric motor on each carriage plate incorporated into the electric system of the truck (see, FIG. 5). When powered, the motors raise or lower the carriage plates in sync. Other methods can be used to raise the carriage plate such as a linear actuator system or a lead screw system. The rack and pinion is preferred due to its space efficiency and simplicity of design.

Figure 2:
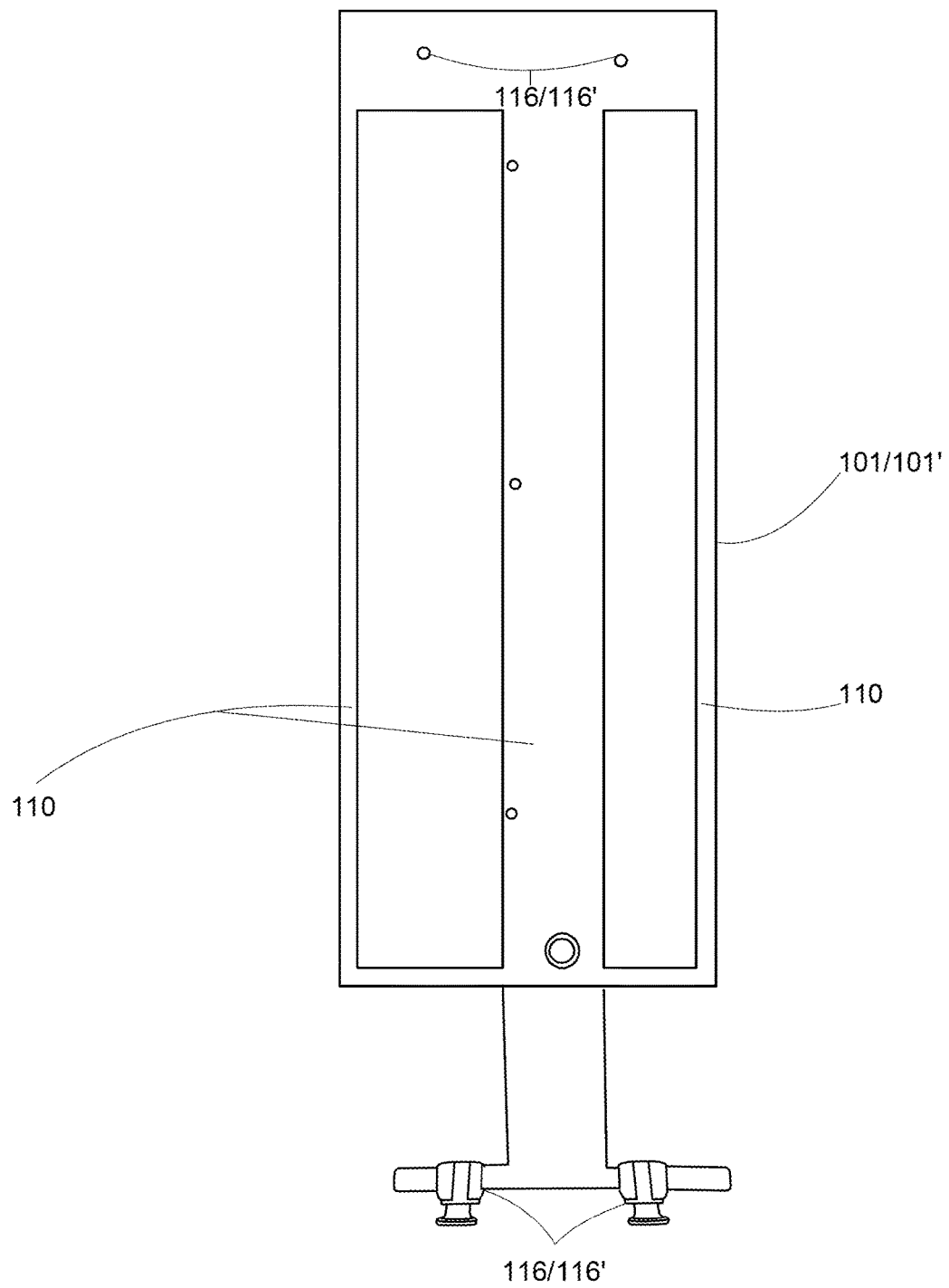
FIG. 2 is a frontal view of an exemplary mounting plate of an exemplary truck container lift system of the present invention.
Figure 2A:
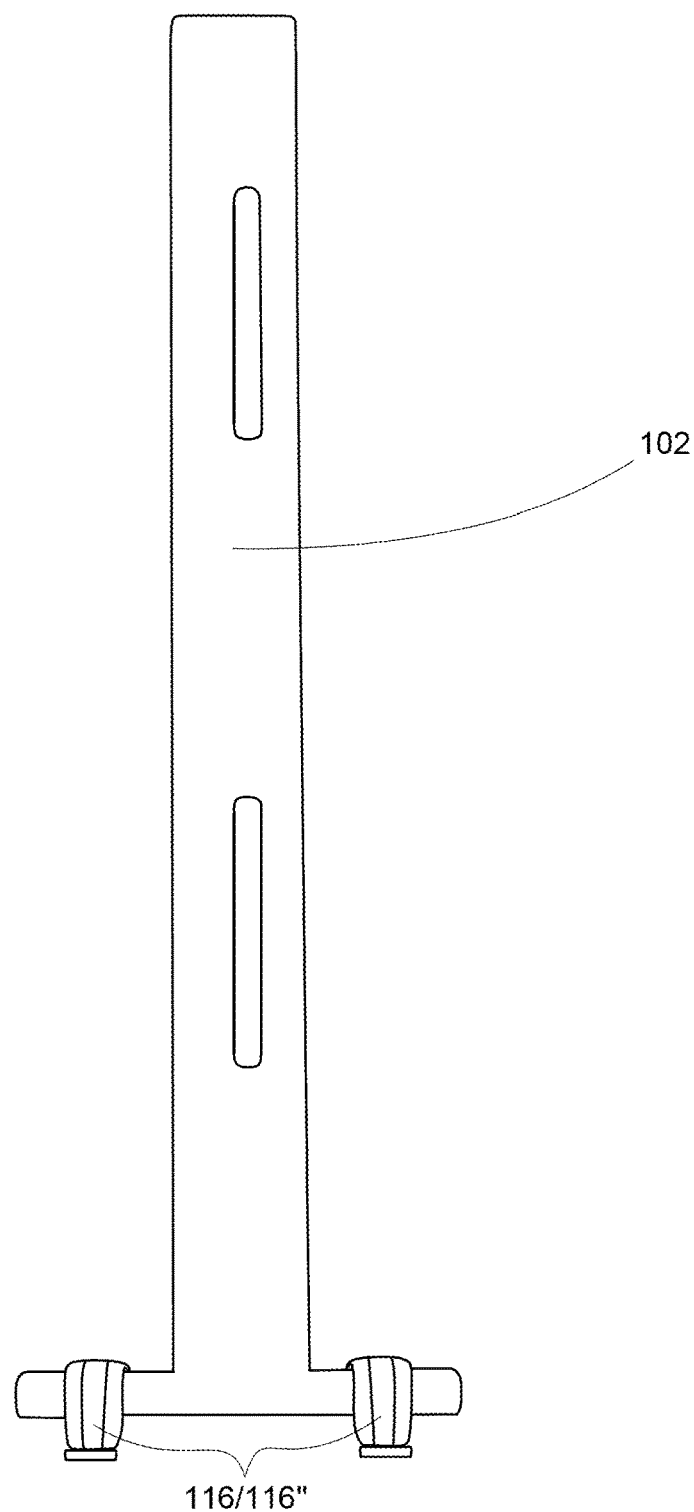
FIG. 2a is a frontal view of an exemplary mounting plate adjustable extension of an exemplary truck container lift system of the present invention.
Figure 3:
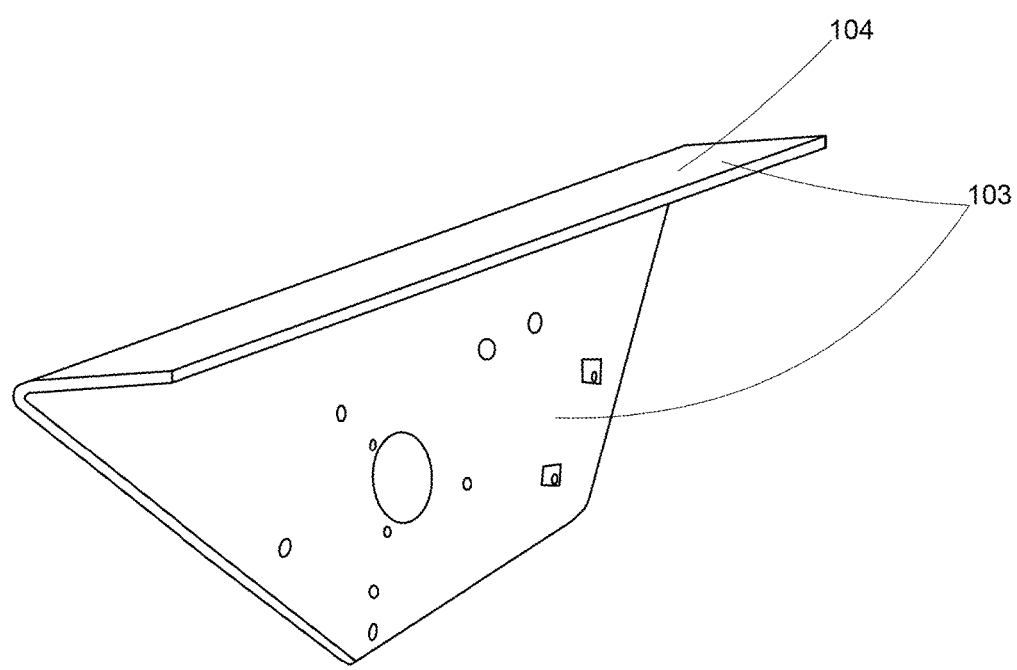
FIG. 3 is a frontal view of an exemplary carriage plate of an exemplary truck container lift system of the present invention.

The mounting plate, desirably, a metal mounting plate, is affixed to the truck by bolts at the top end of the vertical plane (see, FIG. 2) and with an adjustable extension at the bottom (see, FIG. 2a). The mounting plate is designed having two outrigger metal rods (see, FIG. 2), one on each side of the plate and connected at the top and bottom of the plate leaving a space for attachment rollers (see, FIG. 4). The rollers on each side of the rods affix the carriage plate to the mounting plate (see, FIG. 6). A rack on which the pinion rides is attached to the truck side of the plate.

Figure 4:
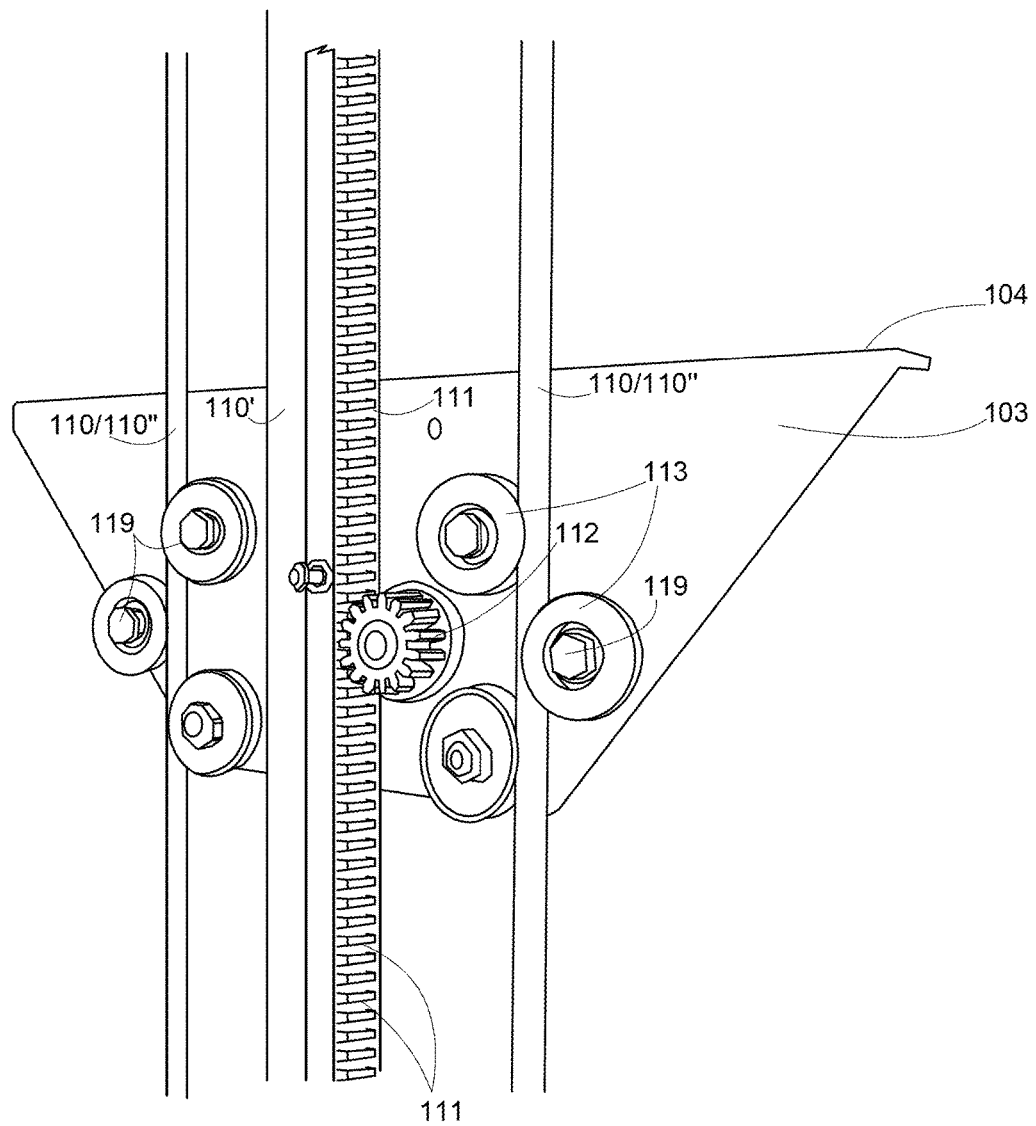
FIG. 4 is a rear view of the exemplary carriage plate shown in FIG. 3 movably attached to the exemplary mounting plate shown in FIG. 2.

The metal carriage plate comprises a 90 degree angle with the 90 degree angle facing downward when affixed to the mounting plate (see, FIG. 4). The carriage plate typically has six rollers affixed by axels at locations the width of the mounting plate and on each side of the outrigger rods. The carriage plate will then roll up and down on the mounting plate (see, FIG. 4). A pinion gear is affixed through the carriage plate so that the gear can ride on the rack affixed to the mounting plate. The gear shaft extends through the carriage plate and is connected to the 12 volt motor mounted on the underside of the 90 degree carriage plate (see, FIG. 5).

The rollers affix the carriage plate to the mounting plate and the pinion gear is meshed with the gear rack on the mounting plate (see, FIG. 4). When the motor is energized the gear will turn and raise or lower the carriage plate on a vertical plane while the stationary mounting plate remains affixed to the truck. When the tool box is bolted to the carriage plate surface that is at a 90 degree from the mounting plate (see, FIG. 5) and the motor is activated, the tool box will be raised or lowered according to the revolution direction of the motor.

The present invention is unique and novel by creating useable space with the use of a uniquely positioned and efficiently designed lifting mechanism.

The present invention is further directed to truck containers such as exemplary truck container 10 (e.g., truck toolbox 10) shown in FIGS. 19-31 that can be used in combination with the herein-described container lift systems.

As shown in FIGS. 19-31, exemplary truck container 10 comprises: (I) a container housing 11 comprising: (a) a housing upper surface 12, (b) a housing lower surface comprising a main body lower surface 13 and outer edge lower surfaces 14 on opposite ends of said main body lower surface 13, said outer edge lower surfaces 14 being sized and configured to rest along upper edges 201 of a truck bed 200 with said main body lower surface 13 extending into the truck bed 200; and (c) one or more housing outer side surfaces 15 integrally connected to said main body lower surface 13 so as to form a housing outer surface 16 that surrounds and encompasses a toolbox housing volume 17; wherein at least one opposing housing outer side surface 15' within said one or more housing outer side surfaces 15 (i) extends between said main body lower surface 13 and said outer edge lower surface 14, and (ii) comprises an opening 18 therein.

The present invention is further directed to methods of making and using truck container lift systems and truck containers as described herein.

Additional embodiments of the present invention are provided below.

Additional Embodiments

Truck Container Lift Systems

1. A truck container lift system 1000 comprising: a pair of lifting components 100 positionable along opposite side surfaces 202 of a truck bed 200 behind a driver cab 203 of the truck 205, said pair of lifting components 100 being capable of lifting a truck container 10 positioned between said pair of lifting components 100 without occupying any truck bed surface area between said pair of lifting components 100.

2. The truck container lift system 1000 of claim 1, wherein each lifting component 100 within said pair of lifting components 100 comprises an attachment shelf 104 on which opposite outer lower side edges 131 of a truck container 10 rest when the truck container 10 is positioned between said pair of lifting components 100.

3. The truck container lift system 1000 of claim 2, wherein said attachment shelf 104 of each lifting component 100 is the only component of each lifting component 100 that is in contact with a truck container 10 positioned between said pair of lifting components 100.

4. The truck container lift system 1000 of any one of claims 1 to 3, wherein each lifting component 100 within said pair of lifting components 100 comprises a mounting plate 101 that extends from a truck bed surface 204 to a securing location 206 along an upper side surface 202' of said opposite side surfaces 202 of the truck bed 200.

5. The truck container lift system 1000 of claim 4, wherein mounting plate 101 comprises (i) a based mounting plate component 101' and (ii) a mounting plate adjustable extension 102, said based mounting plate component 101' and said mounting plate adjustable extension 102 being movably attached to one another so as to adjust an overall height of said mounting plate 101.

6. The truck container lift system 1000 of claim 5, wherein said mounting plate adjustable extension 102 extends from said truck bed surface 204 to said based mounting plate component 101', and said based mounting plate component 101' extends from said mounting plate adjustable extension 102 to said securing location 206.

7. The truck container lift system 1000 of any one of claims 4 to 6, wherein said mounting plate 101 comprises two or more vertically-extending mounting plate rods 110.

8. The truck container lift system 1000 of any one of claims 4 to 7, wherein said mounting plate 101 comprises three or more vertically-extending mounting plate rods 110.

9. The truck container lift system 1000 of any one of claims 5 to 8, wherein said base mounting plate component 101' comprises two or more vertically-extending mounting plate rods 110.

10. The truck container lift system 1000 of any one of claims 5 to 9, wherein said base mounting plate component 101' comprises three or more vertically-extending mounting plate rods 110.

11. The truck container lift system 1000 of any one of claims 4 to 10, wherein each lifting component 100 within said pair of lifting components 100 further comprises a gear rack 111 positioned along said mounting plate 101, said gear rack 111 extending a distance $d_{gr}$ between said truck bed surface 204 and said securing location 206 along said opposite side surfaces 202 of the truck bed 200. See, for example, FIG. 6.

12. The truck container lift system 1000 of claim 11, wherein said gear rack 111 is positioned along one of said two or more vertically-extending mounting plate rods 110.

13. The truck container lift system 1000 of claim 11 or 12, wherein said gear rack 111 is positioned along a central mounting plate rod 110' within said three or more vertically-extending mounting plate rods 110.

14. The truck container lift system 1000 of any one or claims 11 to 13, wherein said gear rack 111 is positioned along a central mounting plate rod 110' within three or more vertically-extending mounting plate rods 110 of said base mounting plate component 101'.

15. The truck container lift system 1000 of any one of claims 2 to 14, wherein each lifting component 100 within said pair of lifting components 100 comprises a carriage plate 103, each carriage plate 103 comprising the attachment shelf 104 on which opposite outer lower side edges 131 of a truck container 10 rest when the truck container 10 is positioned between said pair of lifting components 100.

16. The truck container lift system 1000 of claim 15, wherein said carriage plate 103 (*i*) is connected to said mounting plate 101 and (ii) moves from a lower position along said mounting plate 101 to an upper position along said mounting plate 101.

17. The truck container lift system 1000 of claim 15 or 16, wherein said carriage plate 103 further comprises a carriage plate gear 112 that contacts said gear rack 111 along said mounting plate 101.

18. The truck container lift system 1000 of any one of claims 15 to 17, wherein said carriage plate 103 further comprises one or more attachment rollers 113 that (i) contact said mounting plate 101 and (ii) move from a lower position along said mounting plate 101 to an upper position along said mounting plate 101.

19. The truck container lift system 1000 of claim 18, wherein each attachment roller 113 within said one or more attachment rollers 113 comes into contact with at least one vertically-extending mounting plate rod 110 within said two or more vertically-extending mounting plate rods 110 of said mounting plate 101.

20. The truck container lift system 1000 of claim 18 or 19, wherein said one or more attachment rollers 113 comprise from two to eight attachment rollers 113.

21. The truck container lift system 1000 of any one of claims 18 to 20, wherein said one or more attachment rollers 113 comprise from four to six attachment rollers 113.

22. The truck container lift system 1000 of claim 20 or 21, wherein at least two attachment rollers 113 within said two to eight attachment rollers 113 are positioned along opposite sides of at least one vertically-extending mounting plate rod 110 within said two or more vertically-extending mounting plate rods 110 of said mounting plate 101.

23. The truck container lift system 1000 of any one of claims 20 to 22, wherein at least two attachment rollers 113 within said two to eight attachment rollers 113 are positioned along opposite sides of at least two vertically-extending mounting plate rods 110 within said two or more vertically-extending mounting plate rods 110 of said mounting plate 101.

24. The truck container lift system 1000 of any one of claims 20 to 23, wherein at least two attachment rollers 113 within said two to eight attachment rollers 113 are positioned along opposite sides of two side vertically-extending mounting plate rods 110" within three vertically-extending mounting plate rods 110 of said base mounting plate component 101'.

25. The truck container lift system 1000 of any one of claims 17 to 24, wherein each lifting component 100 within said pair of lifting components 100 further comprises a motor 114 positioned along said carriage plate 103, said motor 114 being capable of rotating said carriage plate gear 112 so as to move said carriage plate 103 along said gear rack 111.

26. The truck container lift system 1000 of any one of claims 17 to 24, wherein said motor 114 is positioned below said attachment shelf 104.

27. The truck container lift system 1000 of claim 25 or 26, wherein said motor 114 and said attachment shelf 104 are the only components of each lifting component 100 that are positioned below a lowermost surface 13 of a truck container 10 positioned between said pair of lifting components 100. In other words, the remaining components of each lifting component 100 are positioned on either side outward from lower side edges 131 of truck container 10, and extend along opposing housing outer side surfaces 15' of a truck container 10 (discussed further below) between a given truck container main body lower surface 13 and a given truck container outer edge lower surface 14.

28. The truck container lift system 1000 of any one of claims 2 to 25, wherein said attachment shelf 104 is the only component of each lifting component 100 that is below a lowermost surface 13 of a truck container 10 positioned between said pair of lifting components 100.

29. The truck container lift system 1000 of any one of claims 1 to 28, wherein each lifting component 100 within said pair of lifting components 100 further comprises lifting component connectors 116 that are suitable for connecting each lifting component 100 to opposite side surfaces 202 of a truck bed 200 behind a driver cab 203 of the truck 205.

30. The truck container lift system 1000 of claim 29, wherein at least a portion of said lifting component connectors 116 are present along said mounting plate 101.

31. The truck container lift system 1000 of claim 29 or 30, wherein said lifting component connectors 116 comprise (i) a first set of lifting component connectors 116' for connecting an upper portion of said mounting plate 101 to opposite side surfaces 202 of a truck bed 200 behind a driver cab 203 of the truck 205, and (ii) a second set of lifting component connectors 116" for connecting a lower portion of said mounting plate 101 to opposite upper side surfaces 204' of a truck bed surface 204 behind a driver cab 203 of the truck 205.

32. The truck container lift system 1000 of any one of claims 1 to 31, wherein said pair of lifting components 100 comprise two substantially similar lifting components 100. As used herein, the term "substantially similar" is used to mean that each lifting component 100 comprises at least 75% of the same components or mirror-images of a given component (e.g., mirror-images of a gear rack 111).

33. The truck container lift system 1000 of any one of claims 1 to 32, wherein said pair of lifting components 100 comprise two substantially identical lifting components 100. As used herein, the term "substantially identical" is used to mean that each lifting component 100 comprises the same components or mirror-images of a given component (e.g., mirror-images of a gear rack 111).

34. The truck container lift system 1000 of any one of claims 1 to 33, wherein each lifting component 100 is covered by opposite outer edge portions 14 of a truck container 10 when the truck container 10 is positioned between said pair of lifting components 100 and behind the driver cab 203 of the truck 205.

35. The truck container lift system 1000 of any one of claims 1 to 34, wherein each lifting component 100 is attached to opposite side surfaces 202 of a truck bed 200 behind the driver cab 203 of the truck 205.

36. The truck container lift system 1000 of any one of claims 1 to 35, wherein each lifting component 100 is attached to opposite upper side surfaces 204' of a truck bed surface 204 behind the driver cab 203 of the truck 205.

37. The truck container lift system 1000 of any one of claims 1 to 36, in combination with a truck container 10 that is positionable (i) between said pair of lifting components 100 and (ii) behind the driver cab 203 of the truck 205.

38. The truck container lift system 1000 of any one of claims 1 to 37, in combination with a truck container 10 positioned (i) between said pair of lifting components 100 and (ii) behind the driver cab 203 of the truck 205.

39. A truck 205 comprising the truck container lift system 1000 of any one of claims 1 to 38.

Truck Containers

40. A truck container 10 comprising: a container housing 11 comprising: (a) a housing upper surface 12, (b) a housing lower surface comprising a main body lower surface 13 and outer edge lower surfaces 14 on opposite ends of said main body lower surface 13, said outer edge lower surfaces 14 being sized and configured to rest along upper edges 201 of a truck bed 200 with said main body lower surface 13 extending into the truck bed 200; and (c) one or more housing outer side surfaces 15 extending between said housing upper surface 12 and housing lower surface 13/14 so as to form a housing outer surface 16 that, in combination with said housing upper surface 12, surrounds and encompasses a housing volume 17; wherein at least one opposing housing outer side surface 15' within said one or more housing outer side surfaces 15 (i) extends between said main body lower surface 13 and said outer edge lower surface 14, and (ii) comprises one or more openings 19 therein, said one or more openings 19 providing access to one or more secure storage compartments 18 within housing volume 17.

41. The truck container 10 of claim 40, wherein both of said opposing housing outer side surfaces 15' extending between said main body lower surface 13 and said outer edge lower surface 14 comprise one or more openings 19 therein to form opposing openings 19, said opposing openings 19 providing access to one or more secure storage compartments 18 within housing volume 17.

42. The truck container 10 of claim 40 or 41, wherein said one or more openings 19 provide access to two or more secure storage compartments 18 within housing volume 17.

43. The truck container 10 of any one of claims 40 to 42, wherein at least one secure storage compartment 18 within housing volume 17 extends a distance $d_{ssc}$ from a given opening 19 that is less than a length $L_{oss}$ between said opposing housing outer side surfaces 15'.

44. The truck container 10 of any one of claims 40 to 43, wherein at least one secure storage compartment 18 within housing volume 17 extends a distance $d_{ssc}$ from a given opening 19 that is substantially equal to a length $L_{oss}$ between said opposing housing outer side surfaces 15'.

45. The truck container 10 of any one of claims 40 to 44, wherein at least one secure storage compartment 18 within housing volume 17 comprises a safe (not shown) positioned within said secure storage compartment 18 so that a safe door (not shown) is accessible through a given opening 19.

46. The truck container 10 of any one of claims 40 to 46, wherein at least one secure storage compartment 18 within housing volume 17 comprises two or more shelves 20 positioned within said secure storage compartment 18 so that an outer edge 21 of each shelf 20 is accessible through a given opening 19.

47. The truck container 10 of claim 46, wherein said two or more shelves 20 are independently movable from a storage position within said secure storage compartment 18 to a use position in which at least a portion of a given shelf 20 is outside of said secure storage compartment 18 and positioned beyond one of said opposing housing outer side surface 15'.

48. The truck container 10 of any one of claims 40 to 47, wherein at least one secure storage compartment 18 within housing volume 17 comprises one or more removable containers (not shown) positioned within said secure storage compartment 18, each of said one or more removable containers comprising bottom and side container walls (not shown).

49. The truck container 10 of claim 48, wherein each removable container comprises a container handle within at least one side container wall.

50. The truck container 10 of any one of claims 40 to 49, wherein at least one secure storage compartment 18 within housing volume 17 comprises one or more integrally connected containers 22 positioned within said secure storage compartment 18', each of said one or more integrally connected containers 22 comprising side and end container walls 23.

51. The truck container 10 of claim 50, wherein at least one of said one or more integrally connected containers 22 comprising a container door 24 for accessing said integrally connected container 22.

52. The truck container 10 of any one of claims 40 to 51, wherein at least one of said one or more openings 19 further comprises an opening door 25 that provides access to said one or more secure storage compartments 18 within housing volume 17.

53. The truck container 10 of claim 52, wherein said opening door 25 is connected to said container housing 11 via one or more hinge members 256.

54. The truck container 10 of claim 52 or 53, wherein said opening door 25 is connected to said container housing 11 via one or more hinge members 256 positioned along a lower edge 27 of said opening door 25.

55. The truck container 10 of claim 52 or 53, wherein said opening door 25 is connected to said container housing 11 via one or more hinge members 256 positioned along a side edge 258 of said opening door 25.

56. The truck container 10 of any one of claims 52 to 55, wherein said opening door 25 further comprises an opening door lock (not shown).

57. The truck container 10 of any one of claims 40 to 56, wherein said one or more housing outer side surfaces 15 comprise (i) opposing housing outer side surfaces 15', (ii) a front housing outer side surface 28, (iii) a rear housing outer side surface 26 opposite said front housing outer side surface 28, and (iv) opposing outer edge side surfaces 29 positioned above said opposing housing outer side surfaces 15'.

58. The truck container 10 of any one of claims 40 to 57, further comprising a container lid 22, said container lid 22 providing access to one or more lid-accessible container compartments 30.

59. The truck container 10 of claim 58, wherein said one or more lid-accessible container compartments 30 are separated from said one or more secure storage compartments 18 within housing volume 17 such that lid access to said one or more lid-accessible container compartments 30 does not provide access to said one or more secure storage compartments 18 within housing volume 17.

60. The truck container 10 of claim 58 or 59 wherein said one or more lid-accessible container compartments 30 comprise two or more lid-accessible container compartments 30.

61. The truck container 10 of any one of claims 58 to 60, wherein said one or more lid-accessible container compartments 30 further comprise one or more outer edge lid-accessible compartments 30' positioned over said outer edge lower surfaces 14.

62. The truck container 10 of any one of claims 58 to 61, wherein said one or more lid-accessible container compartments 30 further comprise at least one outer edge lid-accessible compartment 30' positioned over each of said outer edge lower surfaces 14.

63. The truck container 10 of any one of claims 58 to 62, further comprising at least one container lid connector 35 positioned along a rear outer surface 36 of said container housing 11, each container lid connector 35 connecting (i) said container lid 22 to (ii) said container housing outer surface 16.

64. The truck container 10 of any one of claims 58 to 63, further comprising at least one container lid fastener 37 positioned along a front outer surface 28 of said container housing 11, each container lid fastener 37 being configured to temporarily connect (i) said container lid 22 to (ii) said container housing outer surface 16.

65. The truck container 10 of any one of claims 58 to 64, further comprising at least one container lid stabilizer (e.g., one or more gas shock locking mechanisms; not shown) positioned within said one or more lid-accessible container compartments 30, each container lid stabilizer (a) being connected to (i) said container lid 22 and (ii) an inner wall of said one or more lid-accessible container compartments 30, and (b) temporarily locking said container lid 22 in an open position.

66. The truck container 10 of any one of claims 58 to 65, wherein said container lid 22 comprises said housing upper surface 12 and has an overall rectangular shape.

67. The truck container 10 of any one of claims 40 to 66, wherein said housing volume 17 has a combined storage volume of at least 3.0 cubic feet (ft$^3$). Typically, said housing volume 17 has a combined storage volume of from about 4.0 ft$^3$ to about 16.0 ft$^3$, more typically, from about 8.0 ft$^3$ to about 13.0 ft$^3$.

68. The truck container 10 of any one of claims 40 to 67, wherein outer container housing walls 45 of said container housing 11 (see, FIG. 31) comprise a container housing outer wall structure comprising one or more layers of container housing outer wall material, said one or more layers of container housing outer wall material comprising a metallic material, a polymeric material, a fiber-reinforced polymeric or resin material, or any combination thereof.

69. The truck container 10 of any one of claims 58 to 68, wherein said container lid 22 comprises a container lid structure comprising one or more layers of container lid material, said one or more layers of container lid material comprising a metallic material, a polymeric material, a fiber-reinforced polymeric or resin material, or any combination thereof.

70. The truck container 10 of claim 68 or 69, wherein said one or more layers of container housing outer wall material further comprises an outermost paint layer 47.

71. The truck container 10 of any one of claims 68 to 70, wherein said one or more layers of container lid material further comprises an outermost paint layer 48.

72. The truck container 10 of claim 70 or 71, wherein said outmost paint layer 47/48 comprises a polyurethane paint (e.g., IMRON paint available from DuPont).

73. The truck container 10 of any one of claims 58 to 72, wherein each of said one or more lid-accessible container compartments 30 further comprises a compartment drain 51. See, FIG. 31.

74. The truck container 10 of claim 73, wherein each of said one or more lid-accessible container compartments 30 further comprises a compartment drain plug (not shown) (e.g., a 1.0 inch diameter compartment drain plug).

75. The truck container 10 of any one of claims 40 to 74, wherein any hardware, latches, hinges, and/or screws (e.g., container connector 35 and container lid fastener 37) used to form said truck container 10 independently comprises stainless steel, marine grade stainless steel, polymeric material, or any combination thereof.

76. The truck container 10 of any one of claims 40 to 75, further comprising one or more objects (not shown) positioned within said one or more secure storage compartments 18 within housing volume 17.

77. The truck container 10 of claim 76, wherein said one or more objects (not shown) comprise a pistol, a rifle, a safe, a removable lockbox, a suitcase, a travel bag, food, or any combination thereof.

78. The truck container 10 of any one of claims 40 to 77, in combination with the truck container lift system 1000 of any one of claims 1 to 36.

79. The truck container 10 of any one of claims 40 to 77 positioned (i) between said pair of lifting components 100 of the truck container lift system 1000 of any one of claims 1 to 36, and (ii) behind a driver cab 203 of a truck 205.

80. A truck 205 comprising the truck container lift system 1000 of any one of claims 1 to 38 with the truck container 10 of any one of claims 40 to 77 positioned (i) on the attachment shelves 104 of said pair of lifting components 100 of the truck container lift system 1000 of any one of claims 1 to 36.

Methods of Making Truck Lift Systems and Truck Containers

81. A method of making the truck container 10 of any one of claims 40 to 77, said method comprising: forming the container housing 11 so as to form the one or more secure storage compartments 18 within housing volume 17.

82. The method of claim 81, further comprising forming the container lid 22.

83. The method of claim 81 or 82, wherein said forming step comprises a welding step, a thermoforming step, a metal-processing step, a metal machining step, a metal cutting step, a metal shaping step, or any combination thereof.

84. The method of any one of claims 81 to 83, further comprising a connecting step wherein the container lid 22 is attached to the container housing 11.

85. The method of any one of claims 81 to 84, further comprising a connecting step wherein the opening door 25 is attached to the container housing 11.

86. The method of any one of claims 81 to 85, further comprising positioning a safe (not shown) within the one or more secure storage compartments 18 within housing volume 17.

87. A method of making truck container lift system 1000 of any one of claims 1 to 36, said method comprising: forming one or more components within each pair of lifting components 100.

88. The method of claim 87, further comprising assembling the one or more components with one another so as to form each pair of lifting components 100.

89. The method of claim 87 or 88, wherein the one or more components comprise the mounting plate 101, the mounting plate adjustable extension 102, the carriage plate 103, the gear rack 111, the carriage plate gear 112, and the one or more attachment rollers 113.

90. The method of any one of claims 87 to 89, wherein said forming step comprises a welding step, a thermoforming step, a metal-processing step, a metal machining step, a metal cutting step, a metal shaping step, a hole drilling step, or any combination thereof.

91. The method of any one of claims 88 to 90, wherein said assembling step comprises connecting the mounting plate 101, the mounting plate adjustable extension 102, the carriage plate 103, the gear rack 111, the carriage plate gear 112, and the one or more attachment rollers 113 to one another.

92. The method of any one of claims 88 to 91, wherein said assembling step comprises utilizing one or more nuts 118 and bolts 119 to connect the mounting plate 101, the mounting plate adjustable extension 102, the carriage plate 103, the gear rack 111, the carriage plate gear 112, and the one or more attachment rollers 113 to one another.

Methods of Using Truck Lift Systems and Truck Containers

93. A method of using the truck container 10 of any one of claims 1 to 38, said method comprising: placing one or more objects (not shown) within the one or more secure storage compartments 18 within housing volume 17.

94. The method of claim 93, wherein the one or more objects (not shown) comprise a pistol, a rifle, a safe, a removable lockbox, a suitcase, a travel bag, food, or any combination thereof.

95. The method of claim 93 or 94, further comprising: opening the container lid 22 by lifting a container lid front edge 44 of the container lid 22 to access the one or more lid-accessible container compartments 30 within container volume 17.

96. A method of vertically moving a truck container 10 positioned within a bed 200 of a truck 205, said method comprising: using the truck container lift system 1000 of any one of claims 1 to 36 to vertically move a truck container 10 positioned (i) between the pair of lifting components 100 and (ii) behind the driver cab 203 of the truck 205.

97. The method of claim 96, wherein the truck container 10 is the truck container 10 of any one of claims 1 to 38.

98. The method of claim 97, further comprising lowering the truck container 10 to a secure position in which the one or more secure storage compartments 18 within housing volume 17 are inaccessible due to side walls 208 of a truck bed 200.

99. The method of claim 97 or 98, further comprising raising the truck container 10 to a unsecure position in which the one or more secure storage compartments 18 within housing volume 17 are accessible above side walls 208 of a truck bed 205.

It should be understood that other lifting mechanisms may be used in the present invention to vertically move a truck container 10, instead of the above-described pair of lifting components 100. For example, instead of a gear/motor combination, the pair of lifting components 100 may comprise a linear actuator (e.g., pneumatic) system or a lead screw system for moving carriage plate 103 along a given mounting plate 101. In addition, the pair of lifting components 100 may be positioned at any location within the truck bed 200 of a truck 205 to vertically move a truck container 10. Lastly, the pair of lifting components 100 may be positioned at any location within vehicles, other than a truck, to vertically move a truck container 10 within the vehicle.

It should be understood that although the above-described truck container lift systems, truck containers and methods are described as "comprising" one or more components, features or steps, the above-described truck container lift systems, truck containers and methods may "comprise," "consists of" or "consist essentially of" any of the above-described components and/or features and/or steps of the truck container lift systems, truck containers and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a truck container lift system, a truck container and/or a method that "comprises" a list of elements (e.g., components or features or steps) is not necessarily limited to only those elements (or components or features or steps), but may include other elements (or components or features or steps) not expressly listed or inherent to the truck container lift system, the truck container and/or the method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define truck container lift systems, truck containers and/or methods that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described truck container lift systems, truck containers and/or methods may comprise, consist essentially of, or consist of any of the herein-described components and features, as shown in the figures with or without any additional feature(s) not shown in the figures. In other words, in some embodiments, the truck container lift systems, truck containers and/or methods of the present invention may have any additional feature(s) that is not specifically shown in the figures. In some embodiments, the truck container lift systems, truck containers and/or methods of the present invention do not have any additional features other than those (i.e., some or all) shown in the figures, and such additional features, not shown in the figures, are specifically excluded from the truck container lift systems, truck containers and/or methods.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Truck container lift systems and truck containers similar to exemplary Truck container lift systems 1000 and exemplary truck containers 10 shown in FIGS. 1-31, were prepared using one or more of the above-described method steps (e.g., forming and/or connecting steps).

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof. In addition, it is understood to be within the scope of the present invention that the disclosed and claimed fuel tanks and/or methods may be useful in other applications. Therefore, the scope of the invention may be broadened to include the use of the claimed and disclosed structures for such other applications.

What is claimed is:

1. A truck container lift system comprising:
   a pair of lifting components positionable along opposite side surfaces of a truck bed behind a driver cab of the truck, said pair of lifting components being capable of lifting a truck container positioned between said pair of lifting components without occupying any truck bed surface area between said pair of lifting components, wherein each lifting component within said pair of lifting components comprises (1) an attachment shelf on which opposite outer lower side edges of a truck container rest when the truck container is positioned between said pair of lifting components, and (2) a mounting plate that extends from a truck bed surface to a securing location along an upper side surface of said opposite side surfaces of the truck bed; and
   a truck container positioned (i) between said pair of lifting components and (ii) behind the driver cab of the truck, wherein (I) no component of said truck container lift system extends through said truck container, (II) said mounting plate comprises (i) a based mounting plate component and (ii) a mounting plate adjustable extension, said based mounting plate component and said mounting plate adjustable extension being movably attached to one another so as to adjust an overall height of said mounting plate with said mounting plate adjustable extension extending from said truck bed surface to said based mounting plate component, and said based mounting plate component extending from said mounting plate adjustable extension to said securing location, and (III) said mounting plate comprises three or more vertically-extending mounting plate rods, and each lifting component within said pair of lifting components further comprises a gear rack positioned along said mounting plate, said gear rack extending a distance between said truck bed surface and said securing location along said opposite side surfaces of the truck bed, said gear rack being positioned along a central mounting plate rod within said three or more vertically-extending mounting plate rods.

2. The truck container lift system of claim 1, wherein said attachment shelf of each lifting component is the only component of each lifting component that is in contact with the truck container positioned between said pair of lifting components.

3. The truck container lift system of claim 1, wherein each lifting component within said pair of lifting components comprises a carriage plate, each carriage plate comprising the attachment shelf on which opposite outer lower side edges of a truck container rest when the truck container is positioned between said pair of lifting components, wherein said carriage plate (i) is connected to said mounting plate, (ii) moves from a lower position along said mounting plate to an upper position along said mounting plate, and (iii) further comprises a carriage plate gear that contacts said gear rack along said mounting plate.

4. The truck container lift system of claim 3, wherein said carriage plate further comprises from two to eight attachment rollers that (i) contact said mounting plate and (ii) move from a lower position along said mounting plate to an upper position along said mounting plate, each attachment roller within said from two to eight attachment rollers comes into contact with at least one vertically-extending mounting plate rod within said three or more vertically-extending mounting plate rods of said mounting plate.

5. The truck container lift system of claim 4, wherein at least two attachment rollers within said two to eight attachment rollers are positioned along opposite sides of at least one vertically-extending mounting plate rod within said three or more vertically-extending mounting plate rods of said mounting plate.

6. The truck container lift system of claim 5, wherein each lifting component within said pair of lifting components further comprises a motor positioned along said carriage plate, said motor being capable of rotating said carriage plate gear so as to move said carriage plate along said gear rack.

7. The truck container lift system of claim 6, wherein each lifting component within said pair of lifting components further comprises lifting component connectors that are suitable for connecting each lifting component to opposite side surfaces of a truck bed behind a driver cab of the truck, wherein said lifting component connectors comprise (i) a first set of lifting component connectors for connecting an upper portion of said mounting plate to opposite side surfaces of a truck bed behind a driver cab of the truck, and (ii) a second set of lifting component connectors for connecting a lower portion of said mounting plate to opposite upper side surfaces of a truck bed surface behind a driver cab of the truck.

8. The truck container lift system of claim 1, wherein said truck container comprises:
a container housing comprising:
(a) a housing upper surface,
(b) a housing lower surface comprising a main body lower surface and outer edge lower surfaces on opposite ends of said main body lower surface, said outer edge lower surfaces being sized and configured to rest along upper edges of a truck bed with said main body lower surface extending into the truck bed; and
(c) one or more housing outer side surfaces extending between said housing upper surface and housing lower surface so as to form a housing outer surface that, in combination with said housing upper surface, surrounds and encompasses a housing volume;
wherein at least one opposing housing outer side surface within said one or more housing outer side surfaces (i) extends between said main body lower surface and said outer edge lower surface, and (ii) comprises one or more openings therein, said one or more openings providing access to one or more secure storage compartments within housing volume.

9. The truck container lift system of claim 8, wherein both of said opposing housing outer side surfaces extending between said main body lower surface and said outer edge lower surface comprise one or more openings therein to form opposing openings, said opposing openings providing access to two or more secure storage compartments within housing volume.

10. The truck container lift system of claim 8, wherein at least one secure storage compartment within housing volume extends a distance $d_{ssc}$ from a given opening that is less than or substantially equal to a length $L_{oss}$ between said opposing housing outer side surfaces.

11. The truck container lift system of claim 8, wherein at least one secure storage compartment within housing volume comprises two or more shelves positioned within said secure storage compartment so that an outer edge of each shelf is accessible through a given opening, wherein said two or more shelves are independently movable from a storage position within said secure storage compartment to a use position in which at least a portion of a given shelf is outside of said secure storage compartment and positioned beyond one of said opposing housing outer side surface.

12. The truck container lift system of claim 8, wherein at least one of said one or more openings further comprises an opening door that provides access to said one or more secure storage compartments within housing volume.

13. The truck container lift system of claim 8, wherein said one or more housing outer side surfaces of said truck container comprise (i) opposing housing outer side surfaces, (ii) a front housing outer side surface, (iii) a rear housing outer side surface opposite said front housing outer side surface, and (iv) opposing outer edge side surfaces positioned above said opposing housing outer side surfaces.

14. The truck container lift system of claim 8, wherein said truck container further comprises a container lid, said container lid providing access to one or more lid-accessible container compartments of said truck container, wherein said one or more lid-accessible container compartments are separated from said one or more secure storage compartments within said housing volume such that lid access to said one or more lid-accessible container compartments does not provide access to said one or more secure storage compartments within said housing volume.

15. The truck container lift system of claim 8, further comprising one or more objects positioned within said one or more secure storage compartments within said housing volume, wherein said one or more objects comprise a pistol, a rifle, a safe, a removable lockbox, a suitcase, a travel bag, food, or any combination thereof.

16. A method of using the truck container lift system of claim 8, said method comprising:
placing one or more objects within the one or more secure storage compartments within the housing volume of the truck container; and
lowering the truck container to a secure position in which the one or more secure storage compartments within the housing volume of the truck container are inaccessible due to side walls of a truck bed.

17. A truck container lift system comprising:
a pair of lifting components positionable along opposite side surfaces of a truck bed behind a driver cab of the truck, said pair of lifting components being capable of lifting a truck container positioned between said pair of lifting components without occupying any truck bed surface area between said pair of lifting components; wherein each lifting component within said pair of lifting components comprises (1) an attachment shelf on which opposite outer lower side edges of a truck container rest when the truck container is positioned between said pair of lifting components, and (2) a mounting plate that extends from a truck bed surface to a securing location along an upper side surface of said opposite side surfaces of the truck bed; and
a truck container positioned (i) between said pair of lifting components and (ii) behind the driver cab of the truck, said truck container comprising:
a container housing comprising:
(a) a housing upper surface,
(b) a housing lower surface comprising a main body lower surface and outer edge lower surfaces on opposite ends of said main body lower surface, said outer edge lower surfaces being sized and configured to rest along upper edges of a truck bed with said main body lower surface extending into the truck bed; and (c) one or more housing outer side surfaces extending between said housing upper surface and housing lower surface so as to form a housing outer surface that, in combination with said housing upper surface, surrounds and encompasses a housing volume;

wherein at least one opposing housing outer side surface within said one or more housing outer side surfaces (i) extends between said main body lower surface and said outer edge lower surface, and (ii) comprises one or more openings therein, said one or more openings providing access to one or more secure storage compartments within housing volume, and wherein no component of said truck container lift system extends through said truck container.

18. A truck container comprising:
(I) a container housing comprising:
   (a) a housing upper surface,
   (b) a housing lower surface comprising a main body lower surface and outer edge lower surfaces on opposite ends of said main body lower surface, said outer edge lower surfaces being sized and configured to rest along upper edges of a truck bed with said main body lower surface extending into the truck bed; and
   (c) one or more housing outer side surfaces extending between said housing upper surface and housing lower surface so as to form a housing outer surface that, in combination with said housing upper surface, surrounds and encompasses a housing volume;

wherein at least one opposing housing outer side surface within said one or more housing outer side surfaces (i) extends between said main body lower surface and said outer edge lower surface, and (ii) comprises one or more openings therein, said one or more openings providing access to one or more secure storage compartments within housing volume; and (II) a container lid extending along an upper surface of said truck container, said container lid providing access to one or more lid-accessible container compartments of said truck container, wherein said one or more lid-accessible container compartments are separated from said one or more secure storage compartments within said housing volume such that lid access to said one or more lid-accessible container compartments does not provide access to said one or more secure storage compartments within said housing volume.

19. The truck container of claim 18, in combination with a truck container lift system comprising:
a pair of lifting components positionable along opposite side surfaces of a truck bed behind a driver cab of the truck, said pair of lifting components being capable of lifting the truck container positioned between said pair of lifting components without occupying any truck bed surface area between said pair of lifting components, wherein each lifting component within said pair of lifting components comprises (1) an attachment shelf on which opposite outer lower side edges of the truck container rest when the truck container is positioned between said pair of lifting components, and (2) a mounting plate that extends from a truck bed surface to a securing location along an upper side surface of said opposite side surfaces of the truck bed.

20. The truck container of claim 19, wherein said truck container is positioned between said pair of lifting components of said truck container lift system, and said truck container lift system is positioned along opposite side surfaces of a truck bed behind a driver cab of a truck.

* * * * *